(12) United States Patent
Watanabe et al.

(10) Patent No.: US 10,270,079 B2
(45) Date of Patent: Apr. 23, 2019

(54) LEAD MATERIAL FOR BATTERY

(71) Applicants: Hitachi Metals Neomaterial, Ltd., Suita-shi, Osaka (JP); HITACHI METALS, LTD., Tokyo (JP)

(72) Inventors: Keita Watanabe, Suita (JP); Yoshimitsu Oda, Suita (JP)

(73) Assignee: HITACHI METALS, LTD., Tokyo (JP)

( * ) Notice: Subject to any disclaimer, the term of this patent is extended or adjusted under 35 U.S.C. 154(b) by 387 days.

(21) Appl. No.: 15/248,428

(22) Filed: Aug. 26, 2016

(65) Prior Publication Data

US 2017/0077481 A1    Mar. 16, 2017

(30) Foreign Application Priority Data

Sep. 11, 2015 (JP) .................. 2015-179700

(51) Int. Cl.
*H01M 2/26* (2006.01)
(52) U.S. Cl.
CPC ............. *H01M 2/26* (2013.01); *H01M 2/263* (2013.01)
(58) Field of Classification Search
CPC ..................................... H01M 2/26
See application file for complete search history.

(56) References Cited

U.S. PATENT DOCUMENTS 6,368,717 B1 * 4/2002 Rauschnabel ............ B05D 1/62
427/488

FOREIGN PATENT DOCUMENTS

| CN | 104241581 A | 12/2014 |
|----|-------------|---------|
| JP | 6-23572 A | 2/1994 |
| JP | 2004-285371 A | 10/2004 |
| JP | 2014-025089 A | 2/2014 |
| JP | 2014-217886 A | 11/2014 |
| KR | 2011-0074180 A | 6/2011 |
| KR | 2015-0074985 A | 7/2015 |

OTHER PUBLICATIONS

Office Action dated Aug. 31, 2018, issued in counterpart Chinese Application No. 201610807115.0, with English translation (18 pages).
Office Action dated Jun. 19, 2018, issued in counterpart Korean application No. 10-2016-0114914, with English translation. (17 pages).
Office Action dated Dec. 28, 2018, issued in counterpart Korean Application No. 10-2016-0114914, with English translation. (14 pages).

* cited by examiner

*Primary Examiner* — Jessee R Roe
(74) *Attorney, Agent, or Firm* — Westerman, Hattori, Daniels & Adrian, LLP

(57) ABSTRACT

A lead material for a battery includes a metal plate made of single metal, in which the hardness of a central portion is lower than the hardness of a surface layer portion.

8 Claims, 10 Drawing Sheets

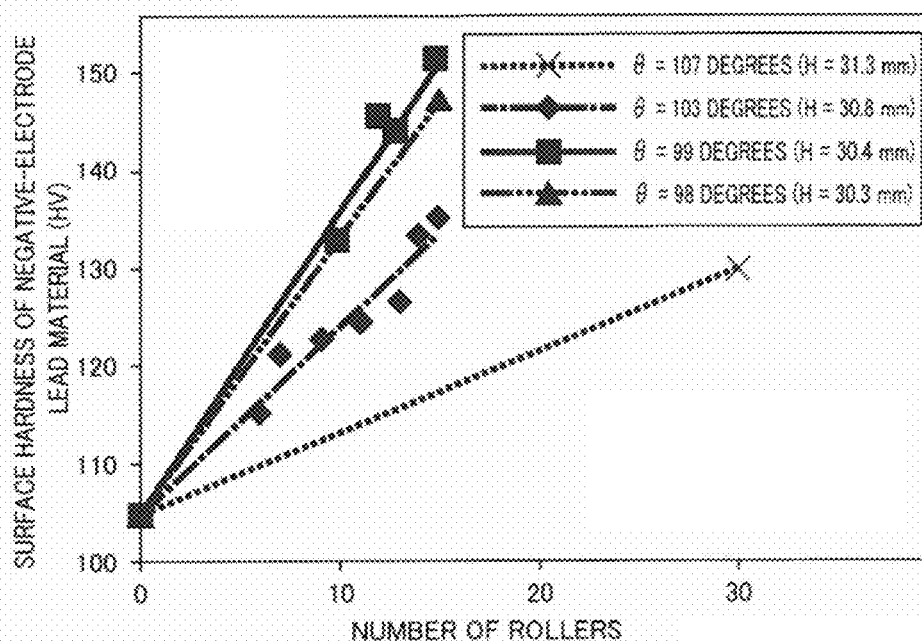

LEAD MATERIAL FOR BATTERY

CROSS-REFERENCE TO RELATED APPLICATION

The priority application number JP2015-179700, Lead Material for Battery and Method for Manufacturing Lead Material for Battery, Sep. 11, 2015, Keita Watanabe et al., upon which this patent application is based, is hereby incorporated by reference.

BACKGROUND OF THE INVENTION

Field of the Invention

The present invention relates to a lead material for a battery and a method for manufacturing the lead material for a battery.

Description of the Background Art

A lead material for a battery used in the battery is known in general, as disclosed in Japanese Patent Laid-Open No. 2004-285371, for example.

Japanese Patent Laid-Open No. 2004-285371 discloses a nickel material strip applicable to a lead of a lithium-ion secondary battery, the hardness of which is adjusted by performing annealing after cold rolling or performing the final cold rolling after annealing. The overall hardness of this nickel material strip is increased to a predetermined hardness by the annealing or the final cold rolling. Thus, the hardness of the nickel material strip is restrained from being rendered lower than the predetermined hardness, whereby large deflection of the nickel material strip is restrained to some extent so that handleability is ensured, and the hardness of the nickel material strip is restrained from being rendered higher than the predetermined hardness, whereby the nickel material strip is easily elongated to some extent so that bending workability is ensured.

However, in the nickel material strip described in Japanese Patent Laid-Open No. 2004-285371, it is difficult to improve both the handleability and the elongation. Therefore, a lead material for a battery, the handleability and the elongation of which are improved is desired.

SUMMARY OF THE INVENTION

The present invention has been proposed in order to solve the aforementioned problem, and an object of the present invention is to provide a lead material for a battery, the handleability and the elongation of which are improved, and a method for manufacturing the lead material for a battery.

A lead material for a battery according to a first aspect of the present invention includes a metal plate made of single metal, in which the hardness of a central portion is lower than the hardness of a surface layer portion. The "single metal" is not restricted to a single element (only Ni or only Cu, for example). In other words, according to the present invention, the "metal plate made of single metal" includes not only a metal plate made of only single metal (element) (made of only a Ni element, for example) but also a metal plate made of only an alloy of given composition (made of only NW4402 Ni-30Cu alloy) defined in JIS, for example). The "central portion" denotes a portion of a region in the vicinity of the center of the metal plate in the plate thickness direction of the metal plate, and the "surface layer portion" denotes a portion of a region in the vicinity of a surface of the metal plate in the plate thickness direction.

In the lead material for a battery according to the first aspect of the present invention, as hereinabove described, the hardness of the central portion of the metal plate is lower than the hardness of the surface layer portion of the metal plate, whereby large deflection of the lead material for a battery can be significantly reduced by the surface layer portion having a certain level of hardness, and hence the handleability of the lead material for a battery can be improved. Furthermore, the central portion is lower in hardness than the surface layer portion so that distortion of the central portion is reduced, and hence the elongation of the lead material for a battery can be improved. Consequently, both the handleability and the elongation of the lead material for a battery can be improved. Therefore, by using the lead material for a battery having improved handleability, the labor required to connect the lead material for a battery to members of the battery can be reduced, and vibrations applied to the battery can be absorbed by the lead material for a battery having improved elongation, whereby fracture and dropping off of the lead material for a battery in the battery can be significantly reduced.

In the aforementioned lead material for a battery according to the first aspect, the hardness of the central portion of the metal plate is preferably not more than 95% of the hardness of the surface layer portion of the metal plate. According to this structure, the amount of distortion of the central portion can be reduced, and hence the elongation of the lead material for a battery can be improved.

In the aforementioned lead material for a battery according to the first aspect, the metal plate is preferably made of pure Ni or a Ni-based alloy. The "Ni-based alloy" denotes an alloy mainly containing Ni. According to this structure, the lead material for a battery can be easily connected to the members of the battery by resistance welding or the like.

In this case, the hardness of the central portion of the metal plate is preferably not more than 90% of the hardness of the surface layer portion of the metal plate. According to this structure, the amount of distortion of the central portion can be further reduced, and hence the elongation of the lead material for a battery including the metal plate made of pure Ni or a Ni-based alloy can be further improved.

In the aforementioned lead material for a battery according to the first aspect, the metal plate is preferably made of pure Cu or a Cu-based alloy. The "Cu-based alloy" denotes an alloy mainly containing Cu, According to this structure, the conductive property of the lead material for a battery can be further improved.

The aforementioned lead material for a battery according to the first aspect preferably further includes a dissimilar metal layer stacked on the metal plate and made of metal that is different in component from the metal plate. According to this structure, the lead material for a battery having improved handleability and elongation and having properties of both the metal plate and the dissimilar metal layer can be provided. Furthermore, this structure can compensate for the disadvantage of the metal plate. Even when metal hardly connected to the members of the battery is used as the single metal of which the metal plate is made, for example, difficulty in connection of the lead material for a battery to the members of the battery can be significantly reduced by properly selecting the dissimilar metal layer.

In this case, the metal plate is preferably held between dissimilar metal layers. According to this structure, the metal plate can be covered with the dissimilar metal layers, and hence if is not necessary to manage the orientation of the front and back of the lead material for a battery so that the handleability of the lead material for a battery can be further improved. In addition, even when metal, which is poor in corrosion resistance, is used as the single metal of which the metal plate is made, corrosion of the lead material for a battery can be significantly reduced by properly selecting the dissimilar metal layers.

A lead material for a battery according to a second aspect of the present invention includes a composite metal plate including a metal plate made of single metal and a dissimilar metal layer made of metal that is different in component from the metal plate, and the hardness of a central portion of the composite metal plate is lower than the hardness of a surface layer portion of the composite metal plate.

In the lead material for a battery according to the second aspect of the present invention, the hardness of the central portion of the composite metal plate is lower than the hardness of the surface layer portion of the composite metal plate, whereby similarly to the lead material for a battery according to the first aspect, both the handleability and the elongation of the lead material for a battery can be improved. Furthermore, the lead material for a battery having properties of both the metal plate and the dissimilar metal layer can be provided.

In the aforementioned lead material for a battery according to the second aspect, the thickness of the dissimilar metal layer is preferably not more than the thickness of the metal plate, and the hardness of the central portion of the composite metal plate is preferably lower than the hardness of the surface layer portion, closer to the metal plate, of the composite metal plate. According to this structure, both the handleability and the elongation of the lead material for a battery can be improved while an increase in the percentage of the dissimilar metal layer is significantly reduced.

A method for manufacturing a lead material for a battery according to a third aspect of the present invention includes preparing a plate material including a metal plate made of single metal and adjusting the hardness of the metal plate such that the hardness of a central portion of the metal plate is lower than the hardness of a surface layer portion of the metal plate by repetitively applying bending to the plate material through a roller leveler.

In the method for manufacturing a lead material for a battery according to the third aspect of the present invention, in addition to the effects of the lead material for a battery according to the first aspect, by repetitively applying bending to the plate material through the roller leveler, the hardness of the surface layer portion of the metal plate can be increased while an increase in the hardness of the central portion of the metal plate is significantly reduced, and hence the hardness of the plate material can be easily adjusted such that the hardness of the central portion is lower than the hardness of the surface layer portion.

In the aforementioned method for manufacturing a lead material for a battery according to the third aspect, adjusting the hardness of the metal plate preferably includes removing a burr of the metal plate in concurrence with adjusting the hardness. According to this structure, even if the burr is formed in preparing the plate material (a cutting step, for example), the burr can be removed while the hardness of the plate material is adjusted by the roller leveler. Thus, the burr can be removed in advance from the lead material for a battery, and hence damages of a power generation element etc. of the battery caused by the burr and dropping off of the burr in the battery can be significantly reduced when the lead material for a battery is used in the battery. Furthermore, it is not necessary to provide removing the burr separately, and hence a manufacturing process for the lead material for a battery can be simplified.

In the aforementioned method for manufacturing a lead material for a battery according to the third aspect, preparing the plate material preferably includes rolling a plate material before rolling including a metal material made of single metal to form a plate material, cutting the plate material hardened by rolling into multiple pieces, and annealing the cut plate material. According to this structure, in adjusting the hardness of the plate material after preparing the plate material, the hardness of the plate material softened by annealing can be adjusted by the roller leveler, and hence the hardness of the central portion can be sufficiently reduced. Furthermore, the plate material hardened by rolling is cut, whereby formation of the burr resulting from the cutting can be significantly reduced as compared with the case where a softened plate material is cut.

In the aforementioned method for manufacturing a lead material for a battery according to the third aspect, adjusting the hardness of the metal plate preferably includes adjusting the hardness of the metal plate in a state where the roller leveler is set to satisfy $5<\theta<90+\tan^{-1}((R1+R2+t)/L)$ and $R1+R2+t<H$ when the radius of a lower roller located below the plate material, which is closer to an inlet through which the plate material is carried in, is set to R1 (mm), the radius of an upper roller located above the plate material, which is closer to the inlet, is set to R2 (mm), a distance between the axes of the lower roller and the upper roller in a conveying direction is set to L (mm), a distance between the axes of the lower roller and the upper roller is set to H (mm), a lower angle defined by a line in a vertical direction passing through the axis of the lower roller and a line connecting the axis of the lower roller and the axis of the upper roller to each other is set to $\theta$ (degree(s)), and the thickness of the lead material for a battery is set to t (mm). According to this structure, bending caused by the roller leveler can be sufficiently applied to the metal plate, and hence the hardness of the surface layer portion of the metal plate can be sufficiently increased. A pair of rollers is preferably placed such that the pair of rollers does not interfere with each other.

In the aforementioned method for manufacturing a lead material for a battery according to the third aspect, adjusting the hardness of the metal plate preferably includes adjusting the hardness of the metal plate such that the hardness of the central portion of the metal plate is not more than 95% of the hardness of the surface layer portion of the metal plate. According to this structure, the amount of distortion of the central portion can be reduced, and hence the elongation of the lead material for a battery can be improved.

In the aforementioned method for manufacturing a lead material for a battery according to the third aspect, the metal plate is preferably made of pure Ni or a Ni-based alloy. According to this structure, the lead material for a battery capable of being easily connected to members of the battery by resistance welding or the like can be obtained.

In the aforementioned method for manufacturing a lead material for a battery according to the third aspect, the metal plate is preferably made of pure Cu or a Cu-based alloy. According to this structure, the lead material for a battery capable of further improving its conductive property can be obtained.

In the aforementioned method for manufacturing a lead material for a battery according to the third aspect, preparing the plate material preferably includes preparing the plate material including the metal plate and a dissimilar metal layer stacked on the metal plate and made of metal that is different in component from the metal plate. According to this structure, the lead material for a battery having improved handleability and elongation and including the composite metal plate having properties of both the metal plate and the dissimilar metal layer can be provided. Furthermore, by repetitively applying bending to the composite metal plate through the roller leveler, the hardness of the surface layer portion of the metal plate can be increased while an increase in the hardness of the central portion of the metal plate is significantly reduced, and hence the hardness of the metal plate can be easily adjusted such that the hardness of the central portion is lower than the hardness of the surface layer portion.

In this case, preparing the plate material including the metal plate and the dissimilar metal layer preferably includes preparing the plate material in which the metal plate is held between dissimilar metal layers. According to this structure, the metal plate can be covered with the dissimilar metal layers, and hence it is not necessary to manage the orientation of the front and back of the lead material for a battery so that the handleability of the lead material for a battery can be further improved. In addition, even when metal, which is poor in corrosion resistance, is used as the single metal of which the metal plate is made, corrosion of the lead material for a battery can be significantly reduced by properly selecting the dissimilar metal layers.

A method for manufacturing a lead material for a battery according to a fourth aspect of the present invention is a method for manufacturing a lead material for a battery including a composite metal plate, and includes forming the composite metal plate by stacking a metal plate made of single metal and a dissimilar metal layer made of metal that is different in component from the metal plate and adjusting the hardness of the composite metal plate such that the hardness of a central portion of the composite metal plate is lower than the hardness of a surface layer portion of the composite metal plate by repetitively applying bending to the composite metal plate through a roller leveler. When the central portion of the composite metal plate is located in the metal plate, the hardness of the surface layer portion and the hardness of the central portion in the metal plate are compared with each other, and when the central portion of the composite metal plate is located in the dissimilar metal layer, the hardness of the surface layer portion and the hardness of the central portion in the dissimilar metal layer are compared with each other. Also according to this structure, the lead material for a battery having improved handleability and elongation and including the composite metal plate having properties of both the metal plate and the dissimilar metal layer can be provided. Furthermore, by repetitively applying bending to the composite metal plate through the roller leveler, the hardness of the surface layer portion of the composite metal plate can be increased while an increase in the hardness of the central portion of the composite metal plate is significantly reduced, and hence the hardness of the composite metal plate can be easily adjusted such that the hardness of the central portion is lower than the hardness of the surface layer portion.

In this case, forming the composite metal plate preferably includes stacking the metal plate and the dissimilar metal layer having a thickness not more than the thickness of the metal plate and including a component different from that of the metal plate, and adjusting the hardness of the composite metal plate preferably includes adjusting the hardness of the composite metal plate such that the hardness of the central portion of the composite metal plate is lower than the hardness of the surface layer portion, closer to the metal plate, of the composite metal plate. According to this structure, in the metal plate, the hardness of the central portion of the composite metal plate can be lower than the hardness of the surface layer portion of the composite metal plate.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 19 is a graph showing a relationship of the surface hardness of the negative-electrode lead material to the number of rollers and an angle θ in a roller leveler.

DESCRIPTION OF THE PREFERRED EMBODIMENTS

Embodiments of the present invention are hereinafter described with reference to the drawings.

First Embodiment

The structure of a battery 100 using a negative-electrode lead material 5 according to a first embodiment of the present invention is now described with reference to FIGS. 1 and 2. The negative-electrode lead material 5 is an example of the "lead material for a battery" in the claims.
<Structure of Battery>

Figure 1:
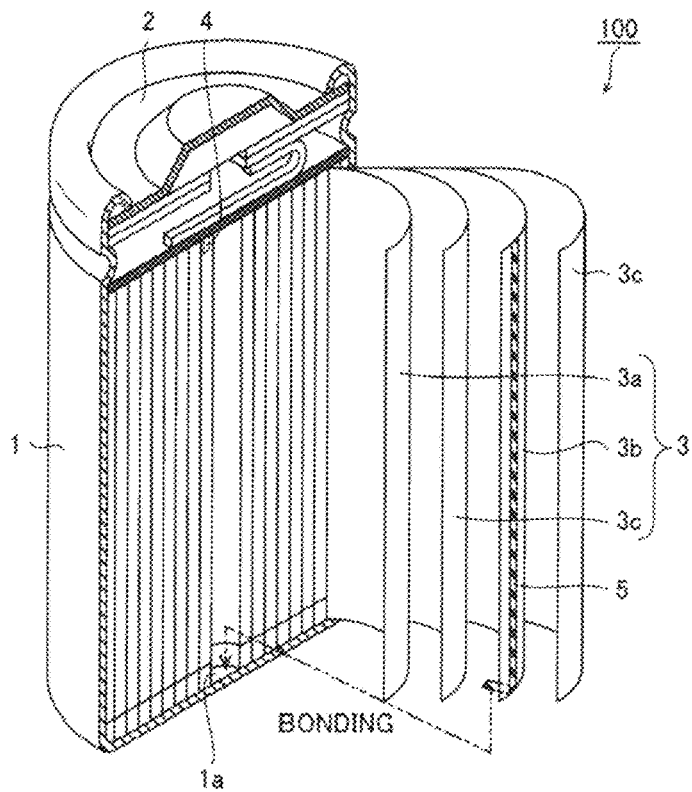
FIG. 1 is a sectional schematic view showing a battery according to a first embodiment of the present invention.

The battery 100 according to the first embodiment of the present invention is a so-called cylindrical lithium-ion battery, as shown in FIG. 1. This battery 100 includes a cylindrical housing 1, a cover material 2 that seals an opening of the housing 1, and a power generation element 3 arranged in the housing 1. The housing 1 is made of a Ni coated sheet, and serves also as a negative-electrode terminal (battery anode) of the battery 100.

In the housing 1, the power generation element 3 and an electrolyte (not shown) are stored. The cover material 2 is made of an aluminum alloy or the like, and serves also as a positive-electrode terminal (battery cathode) of the battery 100. The power generation element 3 is formed by winding a positive-electrode foil 3a, a negative-electrode foil 3b, and an insulating separator 3c arranged between the positive-electrode foil 3a and the negative-electrode foil 3b. The positive-electrode foil 3a is made of an aluminum foil to which a positive-electrode active material (not shown) is applied, such as lithium manganite. The negative-electrode foil 3b is made of a copper foil to which a negative-electrode active material (not shown) is applied, such as carbon.

The battery 100 further includes a positive-electrode lead material 4 configured to connect the positive-electrode foil 3a and the positive-electrode terminal (cover material 2) and the negative-electrode lead material 5 (bold shaded portion in FIG. 1) configured to connect the negative-electrode foil 3b and the negative-electrode terminal (housing 1). The positive-electrode lead material 4 is bonded to the positive-electrode foil 3a and the cover material 2 by resistance welding, for example. The positive-electrode lead material 4 is made of a flat-plate shaped aluminum foil. The negative-electrode lead material 5 is bonded to the negative-electrode foil 3b and the inner bottom surface 1a of the housing 1 by resistance welding, for example.
(Structure of Negative-Electrode Lead Material)

Figure 2:
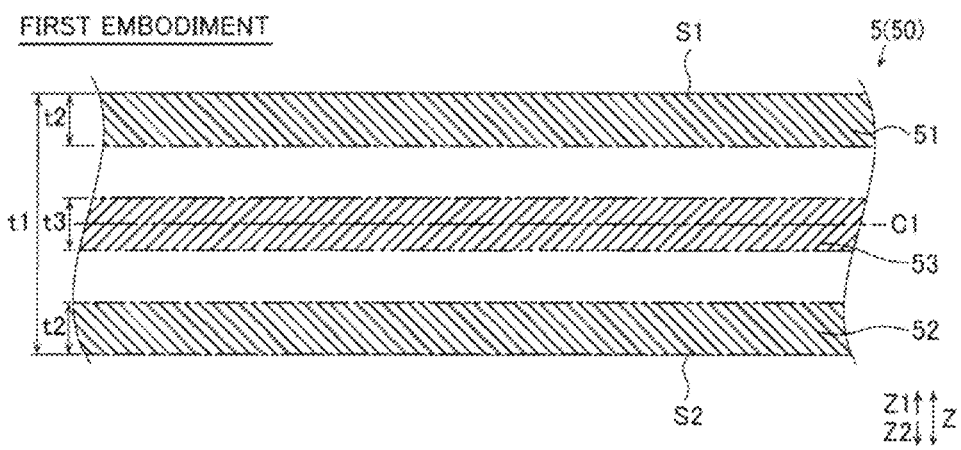
FIG. 2 is a sectional view showing a negative-electrode lead material according to the first embodiment of the present invention.

The negative-electrode lead material 5 includes a metal plate 50 made of pure Mi containing at least 99.0 mass % of Ni, as shown in FIG. 2. For example, the metal plate 50 is made of NW2200 or NW2201 defined in JIS H4551. The metal plate 50 is in the form of a thin plate having a length of about 0.1 mm (thickness t1) in a plate thickness direction (direction Z). The pure Ni is an example of the "single metal" in the claims.

According to the first embodiment, the metal plate 50 includes surface layer portions 51 and 52 and a central portion 53. The surface layer portion 51 includes a first surface S1 of the metal plate 50 on a first side (X1 side) in the plate thickness direction and a region in the vicinity of the first surface S1. The surface layer portion 52 includes a second surface S2 of the metal plate 50 on a second side (Z2 side) in the plate thickness direction and a region in the vicinity of the second surface S2. The central portion 53 includes a center C1 of the metal plate 50 in the plate thickness direction and a region in the vicinity of the center C1.

Specifically, the surface layer portion 51 includes a region corresponding to about 20% of the thickness t1 of the metal plate 50 from the first surface S1 along arrow Z2. Similarly, the surface layer portion 52 includes a region corresponding to about 20% of the thickness t1 of the metal plate 50 from the second surface S2 on the lower side along arrow Z1. In other words, each of the surface layer portions 51 and 52 has a length (thickness t2=0.2×t1) of about 20% of the thickness t1 in the plate thickness direction. The central portion 53 includes a region corresponding to about 10% of the thickness t1 of the metal plate 50 from the center C1 along arrow Z1 and a region corresponding to about 10% of the thickness t1 of the metal plate 50 from the center C1 along arrow Z2. In other words, the central portion 53 includes a region having a length (thickness t3=0.2×t1) in the plate thickness direction corresponding to about 20% of the thickness t1 at the center C1 of the metal plate 50.

According to the first embodiment, the central portion 53 is lower in hardness than the surface layer portions 51 and 52 each having a predetermined hardness (Vickers hardness). The hardness of the central portion 53 is preferably not more than about 95% of the hardness of each of the surface layer portions 51 and 52, and more preferably not more than about 93% of the hardness of each of the surface layer portions 51 and 52. The hardness of the central portion 53 is still more preferably not more than about 90% of the hardness of each of the surface layer portions 51 and 52, For example, the Vickers hardness (HV) of each of the surface layer portions 51 and 52 is about 111.5, and the Vickers hardness (HV) of the central portion 53 is about 99.5 (about 89% of the Vickers hardness of each of the surface layer portions 51 and 52).
<Method for Manufacturing Negative-Electrode Lead Material>

A method for manufacturing the negative-electrode lead material 5 according to the first embodiment of the present invention is now described with reference to FIGS. 2 to 9.

Figure 3:
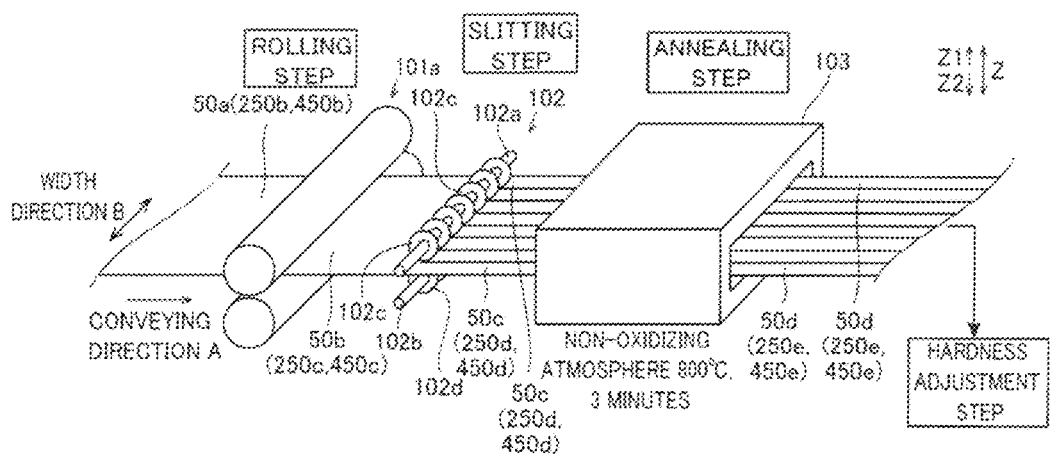
FIG. 3 is a schematic view for illustrating a method for manufacturing a negative-electrode lead material according to first to third embodiments of the present invention.

First, electrolytic Ni (pure Ni) melted in an unshown vacuum melting furnace is casted into an ingot. Then, after the ingot is shaped to a Ni plate material having a predetermined thickness by hot rolling, cold rolling and annealing are repetitively performed (rolling step) on the Ni plate material. Then, as shown in FIG. 3, the final cold rolling is performed by a pair of rollers 101a on a band-like Ni plate material 50a on which cold roiling and annealing have been repetitively performed while the band-like Ni plate material 50a is conveyed in a conveying direction A. Thus, a band-like Ni plate material 50b having a thickness of about 0.1 mm is continuously prepared. On this band-like Ni plate material 50b on which cold rolling has been performed, work-hardening occurs due to the final cold roiling so that the band-like Ni plate material 50b is hardened. The Ni plate material 50a is an example of the "plate material before roiling" in the claims.

Then, the band-like Ni plate material 50b on which the final cold rolling has been performed is continuously slit (slitting step) by a slitting portion 102. The slitting portion 102 includes a rotatable slitting cutter portion 102a and a slitting cutter portion 102b opposed to the slitting cutter portion 102a. The slitting cutter portions 102a and 102b have a plurality of (seven in FIG. 3) cutters 102c and 102d arranged at predetermined slit-widths in a width direction B orthogonal to the conveying direction A, respectively. Thus, the band-like Ni plate material 50b is continuously cut along the conveying direction A while being held between the cutters 102c and 102d, so that a plurality of (eight in FIG. 3) band-like metal plates 50c is formed. In this state, neither the surface layer portions 51 and 52 nor the central portions 53 (see FIG. 2) have been formed yet in the metal plates 50c.

When the band-like Ni plate material is slit, due to cutting by the cutters 102c and 102d, lower portions (22 side) of side sections E of the cut Ni plate material are elongated downward by the upper (Z1 side) cutters 102c, and upper portions (Z1 side) of the side sections E are elongated upward by the lower (Z2 side) cutters 102d. Consequently, burrs are likely to be formed on the side sections E of the metal plates, as shown by a two-dot chain line in FIG. 4, However, according to the first embodiment, the band-like Ni plate material 50b hardened after the roiling step is slit so that the side sections E of the band-like Ni plate material 50b are more unlikely to be elongated as compared to the case where the band-like Ni plate material softened by annealing in a conventional manner is slit. Thus, as shown by a solid line in FIG. 4, the size of the formed burrs can be reduced while formation of the burrs on the side sections E of the metal plates 50c is significantly reduced.

Then, the plurality of metal plates 50c is continuously conveyed into an annealing furnace 103, and are continuously annealed (annealing step), as shown in FIG. 3. At this time, annealing is performed on the metal plates 50c by maintaining a temperature condition of about 800° C. under a non-oxidizing atmosphere inside the annealing furnace 103 and setting the metal plates 50c to be conveyed for about three minutes in the annealing furnace 103. The temperature condition and the holding time are not restricted to about 800° C. and about three minutes, respectively. Thus, a plurality of softened metal plates 50d, the internal distortion resulting from work-hardening of which has been removed, is continuously prepared. Even after the annealing step, neither the surface layer portions 51 and 52 nor the central portions 53 have been formed yet in the metal plates 50d, and the metal plates 50d are generally softened.

(Hardness Adjustment Step Using Roller Leveler)

Figure 5:
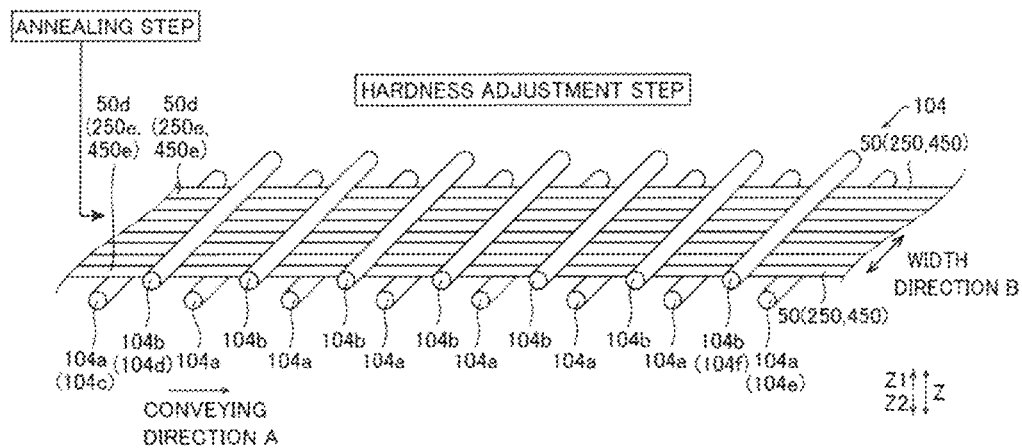
FIG. 5 is a schematic perspective view for illustrating a step for adjusting the hardness in the method for manufacturing a negative-electrode lead material according to the first to third embodiments of the present invention.

In the manufacturing method according to the first embodiment, bending is repetitively applied to the plurality of softened metal plates 50d through a roller leveler 104, as shown in FIG. 5, so that the hardness of the metal plate 50 is adjusted (hardness adjustment step). The roller leveler 104 includes a plurality of (eight in FIG. 5) lower rollers 104a arranged below (Z2 side) the metal plates 50d and a plurality of (seven in FIG. 5) upper rollers 104b arranged above (Z1 side) the metal plates 50d.

Figure 6:
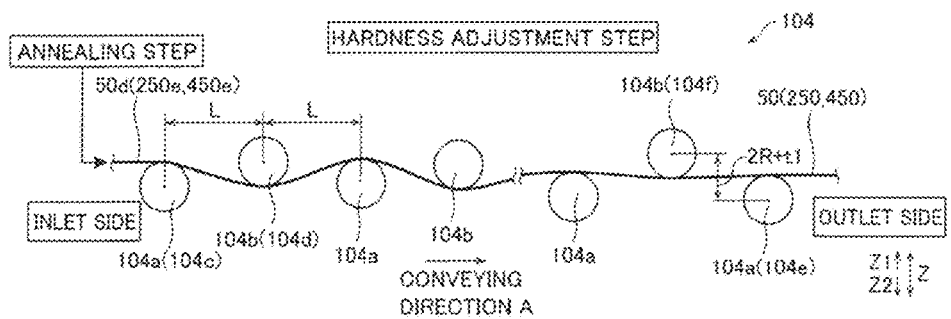
FIG. 6 is a schematic side elevational view for illustrating the step for adjusting the hardness in the method for manufacturing a negative-electrode lead material according to the first to third embodiments of the present invention.
Figure 7:
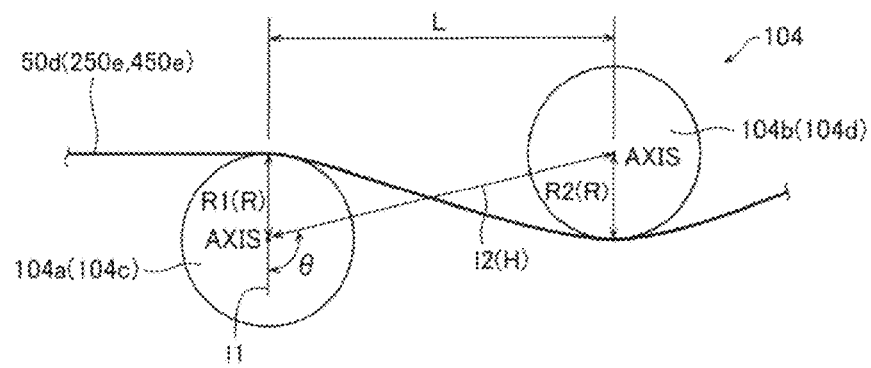
FIG. 7 is a schematic enlarged side elevational view for illustrating the step for adjusting the hardness in the method for manufacturing a negative-electrode lead material according to the first to third embodiments of the present invention.

The lower rollers 104a and the upper rollers 104b each have a predetermined radius R, and have a long columnar shape in the width direction B (see FIG. 5), as shown in FIGS. 6 and 7. The lower rollers 104a and the upper rollers 104b are alternately arranged at distances L between axes in the conveying direction A. As shown in FIG. 7, a lower roller 104c and an upper roller 104d closer to an inlet through which the metal plates 50d are carried in are arranged at a distance H between axes, which is a length obtained by directly connecting the axes of the lower roller 104c and the upper roller 104d to each other. When the radii of the lower roller 104c and the upper roller 104d are set to R1 and R2, respectively, a lower angle defined by a perpendicular 11 in a vertical direction (direction Z) passing through the axis of the lower roller 104c and a line 12 directly connecting the axis of the lower roller 104c and the axis of the upper roller 104d to each other is set to θ, and the thickness of the negative-electrode lead material 5 (the thickness of the metal plates 50d) is set to t1, R1 (mm), R2 (mm), H (mm), θ(degree(s)), L (mm), and t1 (mm) are set to satisfy $5<\theta<90+\tan^{-1}((R1+R2+t)/L)$ and $R1+R2+t<H$. R1, R2, and L may be set in the ranges of $5 \leq R1 \leq 50$, $5 \leq R2 \leq 50$, and $R1+R2<L \leq 5 \times (R1+R2)$. As described above, both the radii of the lower roller 104c and the upper roller 104d, which are equal to each other, are R while the thickness t1 is about 0.1 mm, and hence R (mm), H (mm), and L (mm) are set to satisfy $5 \leq R \leq 50$, $2R+0.1<H$, and $2R<L \leq 10R$, respectively. A curvature applied to the metal plates 50d is determined by R1, R2, H, L, and t1, but it is difficult to unambiguously specify the curvature.

On the other hand, a distance in a plate thickness direction (vertical direction) between the axes of a lower roller 104e and an upper roller 104f closer to an outlet through which the metal plates 50d are carried out is set to (2R+t1). Consequently, bending is hardly applied to the metal plates 50d. Distances in the plate thickness direction between the axes of the lower rollers 104a and the upper rollers 104b are set to gradually reduce from the inlet toward the outlet (along the conveying direction A).

Figure 8:
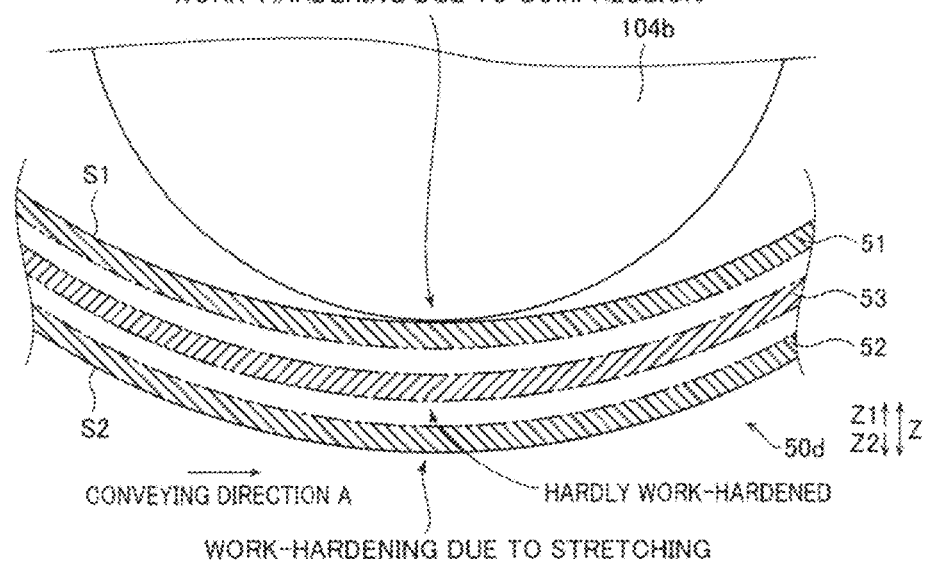
FIG. 8 is a schematic enlarged sectional view for illustrating hardness adjustment in the method for manufacturing a negative-electrode lead material according to the first embodiment of the present invention.

The metal plates 50d are conveyed between the plurality of lower rollers 104a and the plurality of upper rollers 104b of the roller leveler 104 while the same are repetitively bent, whereby the metal plates 50d are conveyed in the roller leveler 104 in a state where the same are in the form of waves having amplitudes in the plate thickness direction. At this time, as shown in FIG. 8, a force sufficient for compression is applied to the region in the vicinity of a surface (the first surface S1 in FIG. 8) closer to the rollers (the upper rollers 104b in FIG. 8), and a force sufficient for elongation is applied to the region in the vicinity of a surface (the second surface S2 in FIG. 8) further away from the rollers. On the other hand, a force sufficient for compression or elongation is hardly applied to the region in the vicinity of the center C1 (see FIG. 2) of the metal plate 50 in the plate thickness direction. This force application resulting from bending is repetitively performed, whereby the metal plate 50 is formed with the surface layer portions 51 and 52 each having the predetermined hardness due to work-hardening in the region in the vicinity of the first surface S1 and in the region in the vicinity of the second surface S2, respectively, and is formed with the central portion 53, which is lower in hardness than the surface layer portions 51 and 52, in the region in the vicinity of the center C1. Hardness adjustment is preferably performed by the roller leveler 104 such that the hardness of the central portion 53 is not more than about 95% of the hardness of each of the surface layer portions 51 and 52.

When the burrs are formed on the metal plates 50d, the burrs are removed by the roller leveler 104. Specifically, the burrs formed on the lower portions of the metal plates 50d come into contact with the lower rollers 104a so that the burrs are pushed upward by the lower rollers 104a, as shown in view (a) of FIG. 9, and when the metal plates 50d come into contact with the upper rollers 104b so that the second surfaces S2 of the metal plates 50d are elongated, the burrs formed on the lower portions do not follow the elongation of the second surfaces S2 but drop off, as shown in view (b) of FIG. 9, whereby the burrs no longer protrude downward from the metal plates 50d. Similarly, the burrs formed on the upper portions of the metal plates 50d come into contact with the upper rollers 104b so that the burrs are pushed upward by the upper rollers 104b, as shown in view (c) of FIG. 9, and when the metal plates 50d come into contact with the lower rollers 104a so that the first surfaces S1 of the metal plates 50d are elongated, the burrs formed on the upper portions do not follow the elongation of the first surfaces S1 but drop off, as shown in view (d) of FIG. 9, whereby the burrs no longer protrude upward from the metal plates 50d. Consequently, the burrs of the metal plates 50d are removed by the roller leveler 104. Thus, the negative-electrode lead material 5 (see FIG. 2) including the metal plate 50 is continuously manufactured.

Effects of First Embodiment

According to the first embodiment, the following effects can be obtained.

According to the first embodiment, as hereinabove described, in the negative-electrode lead material 5 including the metal plate 50 made of single metal (pure Ni), the central portion 53 is lower in hardness than the surface layer portions 51 and 52. Thus, large deflection of the negative-electrode lead material 5 can be significantly reduced by the surface layer portions 51 and 52 each having a certain level of hardness, and hence the handleability of the negative-electrode lead material 5 can be improved. Furthermore, the central portion 53 is lower in hardness than the surface layer portions 51 and 52 so that distortion of the central portion 53 is reduced, and hence the degree of work-hardening in the central portion 53 can be reduced. Thus, the elongation of the negative-electrode lead material 5 can be improved. Consequently, both the handleability and the elongation of the negative-electrode lead material 5 can be improved. Therefore, by using the negative-electrode lead material 5 having improved handleability, the labor required to connect the negative-electrode lead material 5 to the members (the negative-electrode foil 3b and the housing 1) of the battery 100 can be reduced, and vibrations applied to the battery 100 can be absorbed by the negative-electrode lead material 5 having improved elongation, whereby fracture and dropping off of the negative-electrode lead material 5 in the battery 100 can be significantly reduced.

According to the first embodiment, the hardness of the central portion 53 is set to not more than 95% of the hardness of each of the surface layer portions 51 and 52. The hardness of the central portion 53 is preferably set to not more than 93% of the hardness of each of the surface layer portions 51 and 52. The hardness of the central portion 53 is more preferably set to not more than 90% of the hardness of each of the surface layer portions 51 and 52. According to this structure, the amount of distortion of the central portion 53 can be further reduced, and hence the elongation of the negative-electrode lead material 5 can be further improved.

According to the first embodiment, the negative-electrode lead material 5 includes the metal plate 50 made of pure Ni. Thus, the negative-electrode lead material 5 can be easily connected to the members of the battery 100 by resistance welding or the like.

In the manufacturing method according to the first embodiment, bending is repetitively applied to the metal plates 50d through the roller leveler 104. Thus, the hardness of each of the surface layer portions 51 and 52 in the vicinity of the first surface S1 and the second surface S2 can be increased while an increase in the hardness of the central portion 53 of the metal plate 50 is significantly reduced, and hence the hardness of the metal plate 50 can be easily adjusted such that the hardness of the central portion 53 is lower than the hardness of each of the surface layer portions 51 and 52.

In the manufacturing method according to the first embodiment, the burrs of the metal plate 50 are removed while the hardness of the metal plate 50 is adjusted by the roller leveler 104. Thus, even if the burrs are formed when the metal plate 50 is cut in the slitting step, the burrs of the metal plate 50 can be removed while the hardness of the metal plate 50 is adjusted by the roller leveler 104. Consequently, the burrs can be removed in advance from the negative-electrode lead material 5, and hence damages of the power generation element 3 etc. of the battery 100 caused by the burrs and dropping off of the burrs in the battery 100 can be significantly reduced when the negative-electrode lead material 5 is used in the battery 100. Furthermore, it is not necessary to provide a step of removing the burrs separately, and hence a manufacturing process for the negative-electrode lead material 5 can be simplified.

The manufacturing method according to the first embodiment includes the step of rolling the metal material (ingot) made of single metal (pure Ni), the step of forming the plurality of metal plates 50b by cutting the Ni plate material 50b hardened by rolling, and the step of annealing the metal plates 50b formed by cutting the Ni plate material 50b as the step of preparing the metal plates 50d. Thus, in the step of adjusting the hardness of the metal plates 50d after the step of preparing the metal plates 50d, the hardness of the metal plates 50d softened by annealing can be adjusted by the roller leveler 104, and hence the hardness of the central portion 53 can be sufficiently reduced. Furthermore, the Ni plate material 50b hardened by roiling is cut, whereby formation of the burrs resulting from the cutting can be significantly reduced as compared with the case where a softened Ni plate material is cut.

In the manufacturing method according to the first-embodiment, when the radii of the lower roller 104c and the upper roller 104d are set to R1 and R2, respectively, the lower angle defined by the line 11 in the vertical direction (direction Z) passing through the axis of the lower roller 104c and the line 12 connecting the axis of the lower roller 104c and the axis of the upper roller 104d to each other is set to θ, and the thickness of the negative-electrode lead material 5 (the thickness of the metal plates 50d) is set to t1, R1 (mm), R2 (mm), the distance H (mm) between the axes, θ (degree(s)), the distance (a length component in the conveying direction) L (mm) between the axes in the conveying direction A, and t1 (mm) are set to satisfy $5<\theta<90+\tan^{-1}((R1+R2+t)/L)$ and $R1+R2+t<H$. Thus, bending caused by the roller leveler 104 can be sufficiently applied to the metal plate 50, and hence the hardness of each of the surface layer portions 51 and 52 of the metal plate 50 can be sufficiently increased.

Second Embodiment

A second embodiment of the present invention is now described with reference to FIG. 10. In this second embodiment, a negative-electrode lead material 205 includes a clad material 250, unlike the negative-electrode lead material 5 including the metal plate 50 according to the aforementioned first embodiment. The negative-electrode lead material 205 and the clad material 250 are examples of the "lead material for a battery" and the "plate material" in the claims, respectively.

(Structure of Negative-Electrode Lead Material)

Figure 10:
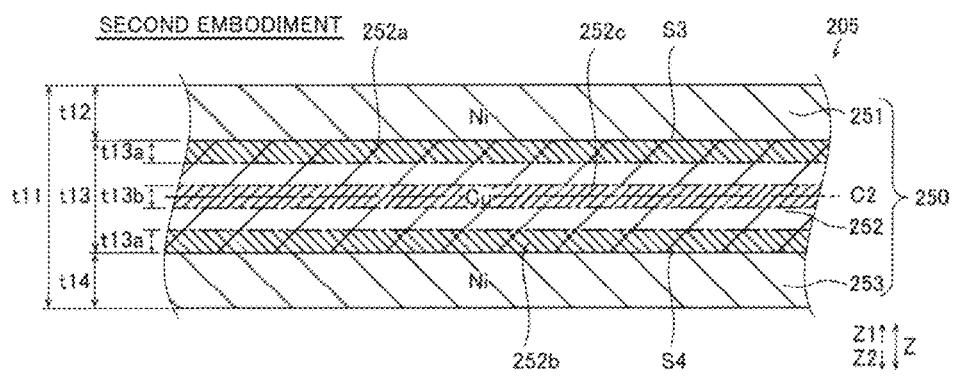
FIG. 10 is a sectional view showing a negative-electrode lead material according to a second embodiment of the present invention.

According to the second embodiment, the negative-electrode lead material 205 includes the clad material 250 in the form of a thin plate having a length (thickness t11) of about 0.1 mm in a plate thickness direction (direction Z), as shown in FIG. 10. The clad material 250 has a three-layered structure in which a Ni layer 251, a Cu layer 252, and a Ni layer 253 are bonded to each other in a state where the same are stacked in the plate thickness direction (direction Z) in this order from a Z1 side. The Cu layer 252 is an example of the "metal plate" in the claims, and the Ni layers 251 and 253 are examples of the "dissimilar metal layer" in the claims.

Both the Ni layers 251 and 253 are made of pure Ni, The Cu layer 252 is made of so-called pure Cu containing at least 99.75 mass % of Cu, Consequently, the Cu layer 252 is held in the plate thickness direction between the Ni layers 251 and 253 made of pure Ni different from pure Cu. The Cu layer 252 is made of C1020 (oxygen-free copper), C1100 (tough pitch copper), C1201 (phosphorous-deoxidized copper), or C1220 (phosphorous-deoxidized copper) defined in JIS H3100. Pure Ni is more excellent in weldability for resistance welding than pure Cu, and pure Cu is lower in electric resistance than pure Ni.

Both of the thicknesses t12 and t14 of the Ni layers 251 and 253 are about 25% of the thickness t11 of the clad material 250, and the thickness t13 of the Cu layer 252 is about 50% of the thickness t11 of the clad material 250, Consequently, the clad material 250 is substantially symmetric with respect to the center C2 of the clad material 250.

According to the second embodiment, the Cu layer 252 includes surface layer portions 252a and 252b and a central portion 252c. The surface layer portion 252a includes a first surface (interface) S3 of the Cu layer 252 closer to the Mi layer 251 (Z1 side) and a region in the vicinity of the first surface S3. The surface layer portion 252b includes a second surface (interface) S4 of the Cu layer 252 closer to the Ni layer 253 (Z2 side) and a region in the vicinity of the second surface S4. The central portion 252c includes the center C2 of the clad material 250 in the plate thickness direction and a region in the vicinity of the center C2.

Specifically, the surface layer portion 252a includes a region corresponding to about 20% of the thickness t13 of the Cu layer 252 from the first surface S3 along arrow Z2. Similarly, the surface layer portion 252b includes a region corresponding to about 20% of the thickness t13 of the Cu layer 252 from the second surface S4 on the lower side along arrow Z1. The central portion 252c includes a region corresponding to about 10% of the thickness t13 of the Cu layer 252 from the center C2 along arrow Z1 and a region corresponding to about 10% of the thickness t13 of the Cu layer 252 from the center C2 along arrow Z2. In other words, the thickness t13a of each of the surface layer portions 252a and 252b and the thickness t13b of the central portion 252c both are (0.2×t13).

According to the second embodiment, the central portion 252c is lower in hardness than the surface layer portions 252a and 252b, The hardness of the central portion 252c is preferably not more than about 95% of the hardness of each of the surface layer portions 252a and 252b, and more preferably not more than about 93% of the hardness of each of the surface layer portions 252a and 252b, For example, the Vickers hardness (HV) of each of the surface layer portions 252a and 252b is about 75.5, and the Vickers hardness (HV) of the central portion 252c is about 70.0 (about 93% of the Vickers hardness of each of the surface layer portions 252a and 252b). The remaining structures of the second embodiment are similar to those of the aforementioned first embodiment.

<Method for Manufacturing Negative-Electrode Lead Material>

A method for manufacturing the negative-electrode lead material 205 according to the second embodiment of the present invention is now described with reference to FIGS. 3 to 6 and 9 to 12.

Figure 11:
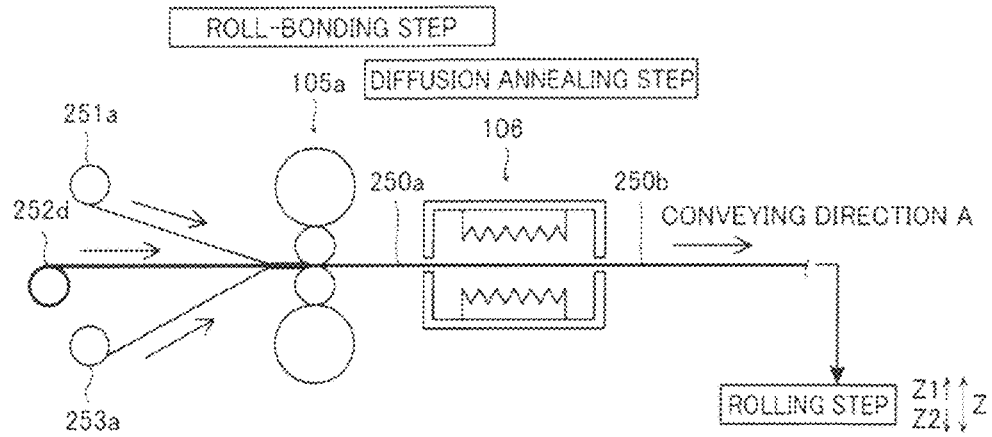
FIG. 11 is a schematic view for illustrating the method for manufacturing a negative-electrode lead material according to the second embodiment of the present invention.
Figure 12:
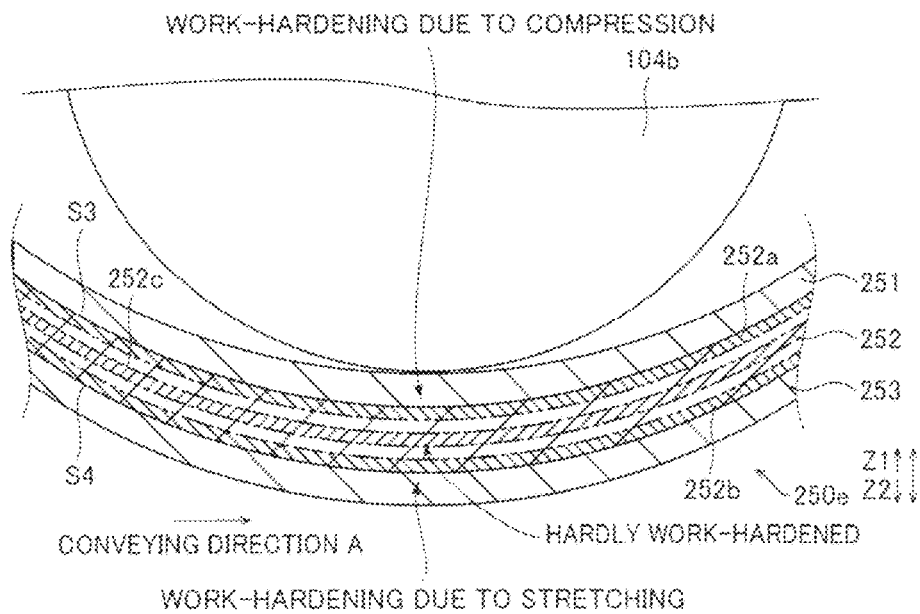
FIG. 12 is a schematic enlarged sectional view for illustrating hardness adjustment in the method for manufacturing a negative-electrode lead material according to the second embodiment of the present invention.

First, a Ni plate 251a made of pure Ni, a Cu plate 252d made of pure Cu, and a Ni plate 253a made of pure Ni are bonded to each other by roiling at a predetermined rolling reduction by a pair of rollers 105a in a state where the same are stacked in this order to have a thickness of about 1 mm, as shown in FIG. 11 (roll-bonding step). Thus, a band-like clad material 250a having a three-layered structure in which the Ni layer, the Cu layer, and the Ni layer (not shown) are banded to each other in a state where the same are stacked in this order in the plate thickness direction is prepared. Then, the band-like clad material 250a is continuously conveyed into an annealing furnace 106, and is continuously diffusion-annealed (diffusion annealing step). At this time, diffusion annealing is performed on the clad material 250a by maintaining a temperature condition of about 800° C. under a non-oxidizing atmosphere inside the annealing furnace 106 and setting the clad material 250a to be conveyed for about three minutes in the annealing furnace 106, The temperature condition and the holding time are not restricted to about 800° C. and about three minutes, respectively. Thus, a clad material 250b having improved bonding strength between the metal layers is prepared. The clad material 250b is an example of the "plate material before rolling" in the claims.

Figure 4:
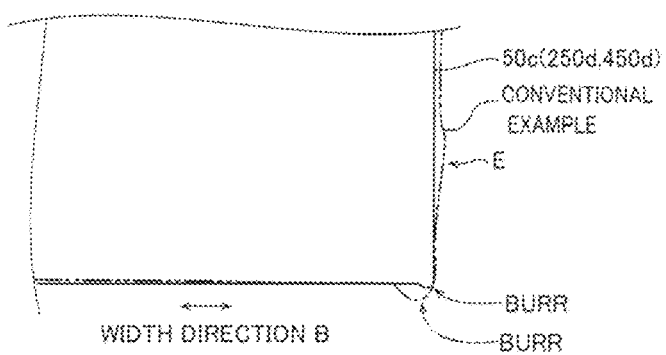
FIG. 4 is a sectional view for illustrating formation of a burr in the method for manufacturing a negative-electrode lead material according to the first to third embodiments of the present invention.

Then, similarly to the aforementioned first embodiment, cold rolling and annealing are repetitively performed (rolling step) on the clad material 250b after diffusion annealing, as shown in FIG. 3, whereby a band-like clad material 250c having a thickness of about 0.1 mm is prepared. Then, similarly to the aforementioned first embodiment, a slitting step is performed on the band-like clad material 250c, whereby a plurality of band-like clad materials 250d is prepared. At this time, similarly to the aforementioned first embodiment, formation of burrs on side sections E of the clad materials 250d is significantly reduced, and the size of the formed burrs is reduced, as shown in FIG. 4. Then, a plurality of band-like clad materials 250e is prepared by performing an annealing step on the plurality of band-like clad materials 250d, similarly to the aforementioned first embodiment, as shown in FIG. 3.

Then, similarly to the aforementioned first embodiment, bending is repetitively applied, through a roller leveler 104, to the plurality of band-like clad materials 250e softened by the annealing step, whereby the hardness of the clad material 250 is adjusted (hardness adjustment step), as shown in FIGS. 5 and 6. Thus, a power sufficient for compression is applied to the region of the Cu layer 252 in the vicinity of a surface (the first surface S3 in FIG. 12) closer to rollers (upper rollers 104b in FIG. 12), and a force sufficient for elongation is applied to the region in the vicinity of a surface (the second surface S4 in FIG. 12) further away from the rollers. On the other hand, a force sufficient for compression or elongation is hardly applied to the region in the vicinity of the center C2 (see FIG. 10) of the clad material 250e in the plate thickness direction. This force application resulting from bending is repetitively performed, whereby the Cu layer 252 of the clad material 250 is formed with the surface layer portions 252a and 252b each having the predetermined hardness due to work-hardening in the region in the vicinity of the first surface S3 and in the region in the vicinity of the second surface S4, respectively, and is formed with the central portion 252c, which is lower in hardness than the surface layer portions 252a and 252b, in the region in the vicinity of the center C2. The burrs of the clad material 250e are removed by the roller leveler 104. Thus, the negative-electrode lead material 205 (see FIG. 10) including the clad material 250 is continuously manufactured.

Effects of Second Embodiments

According to the second embodiment, the following effects can be obtained.

According to the second embodiment, the hardness of the central portion 252c is lower than the hardness of the surface layer portions 252a and 252b in the Cu layer 252 made of single metal (pure Cu). Thus, similarly to the first embodiment, both the handleability and the elongation of the negative-electrode lead material 205 can be improved.

According to the second embodiment, the Cu layer 252 is held in the plate thickness direction between the Ni layers 251 and 253 made of pure Ni different from pure Cu. Thus, the negative-electrode lead material 205 having improved handleability and elongation and having properties of both the weldability of the Ni layers 251 and 253 and the low electric resistance of the Cu layer 252 can be provided. Furthermore, the Cu layer 252 can be covered with the Ni layers 251 and 253, which are excellent in weldability for resistance welding, and hence it is not necessary to manage the orientation of the front and back of the negative-electrode lead material 205 so that the handleability of the negative-electrode lead material 205 can be further improved. In addition, even when the Cu layer 252 made of pure Cu, which is less excellent in weldability for resistance welding, is used, difficulty of connecting the negative-electrode lead material 205 to members (a negative-electrode foil and a housing) of a battery can be significantly reduced by the Ni layers 251 and 253.

The manufacturing method according to the second embodiment includes the step of forming the clad material 250b by stacking the Cu layer 252 made of single metal and the Ni layers 251 and 253 made of metal (pure Ni) different in component from the metal of the Cu layer 252 and the step of adjusting the hardness of the Cu layer 252 such that the hardness of the central portion 252c of the Cu layer 252 is lower than the hardness of each of the surface layer portions 252a and 252b by repetitively applying bending to the plurality of band-like clad materials 250e through the roller leveler 104. Thus, the negative-electrode lead material 205 having improved handleability and elongation and having properties of both the Cu layer 252 and the Ni layers 251 and 253 can be provided.

In the manufacturing method according to the second embodiment, bending is repetitively applied to the clad materials 250e through the roller leveler 104. Thus, the hardness of each of the surface layer portions 252a and 252b in the vicinity of the first surface S3 and the second surface S4 can be increased while an increase in the hardness of the central portion 252c of the Cu layer 252 of the clad material 250 is significantly reduced, and hence the hardness of the Cu layer 252 can be easily adjusted such that the hardness of the central portion 252c is lower than the hardness of each of the surface layer portions 252a and 252b. The remaining effects of the second embodiment are similar to those of the aforementioned first embodiment.

Modification of Second Embodiment

A modification of the second embodiment of the present invention is now described with reference to FIG. 13. In this modification of the second embodiment, a negative-electrode lead material 305 is asymmetric with respect to a center C3 in a plate thickness direction, unlike the negative-electrode lead material 205 according to the aforementioned second embodiment. The negative-electrode lead material 305 is an example of the "lead material for a battery" in the claims.

Figure 13:
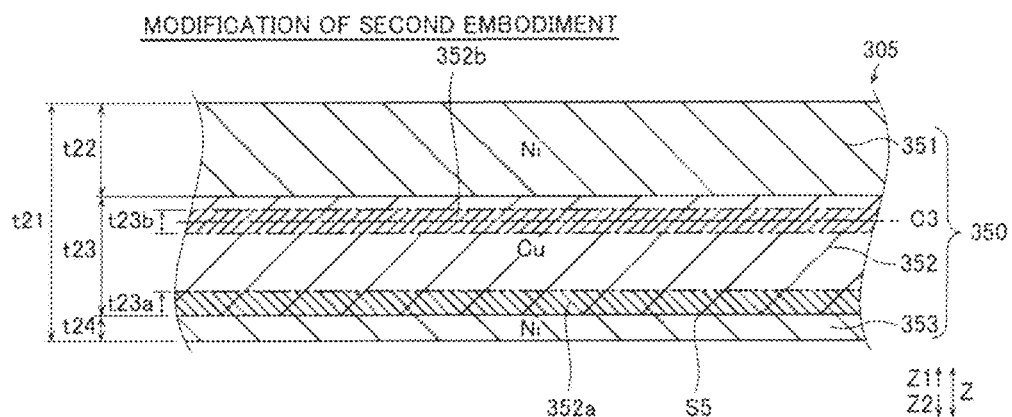
FIG. 13 is a sectional view showing a negative-electrode lead material according to a modification of the second embodiment of the present invention.

According to this modification of the second embodiment, in a three-layered clad material 350 that the negative-electrode lead material 305 includes, the thickness t22 of a Ni layer 351 is about 40% of the thickness t21 of the clad material 350, the thickness t23 of a Cu layer 352 is about 50% of the thickness t21 of the clad material 350, and the thickness t24 of a Mi layer 353 is about 10% of the thickness t21 of the clad material 350, as shown in FIG. 13. Consequently, the clad material 350 is asymmetric with respect to the center C3 of the clad material 350, The clad material 350 is an example of the "composite metal plate" in the claims. The Cu layer 352 is an example of the "metal plate" in the claims, and the Ni layers 351 and 353 are examples of the "dissimilar metal layer" in the claims.

According to this modification of the second embodiment, the Cu layer 352 is formed with a surface layer portion 352a and a central portion 352b. The surface layer portion 352a includes a first surface S5 of the Cu layer 352 closer to the Ni layer 353 (Z2 side) and a region of the Cu layer 352 in the vicinity of the first surface S5. The surface layer portion 352a of the Cu layer 352 is formed in the vicinity of the surface (first surface S5) on the Z2 side further away from the center C3, not on a surface on a Z1 side closer to the center C3 of the clad material 350. The central portion 352b includes the center C3 of the clad material 350 in the plate thickness direction and a region in the vicinity of the center C3.

Specifically, the surface layer portion 352a includes a region corresponding to about 20% of the thickness t23 of the Cu layer 352 from the first surface S5 along arrow Z1. The central portion 352b includes a region corresponding to about 10% of the thickness t23 of the Cu layer 352 from the center C3 along arrow Z1 and a region corresponding to about 10% of the thickness t23 of the Cu layer 352 from the center C3 along arrow Z2. In other words, the thickness t23a of the surface layer portion 352a and the thickness t23b of the central portion 352b both are (0.2×t23). The central portion 352b is lower in hardness than the surface layer portion 352a. The remaining structures, a manufacturing method, and effects of the modification of the second embodiment are similar to those of the aforementioned second embodiment.

Third Embodiment

Figure 14:
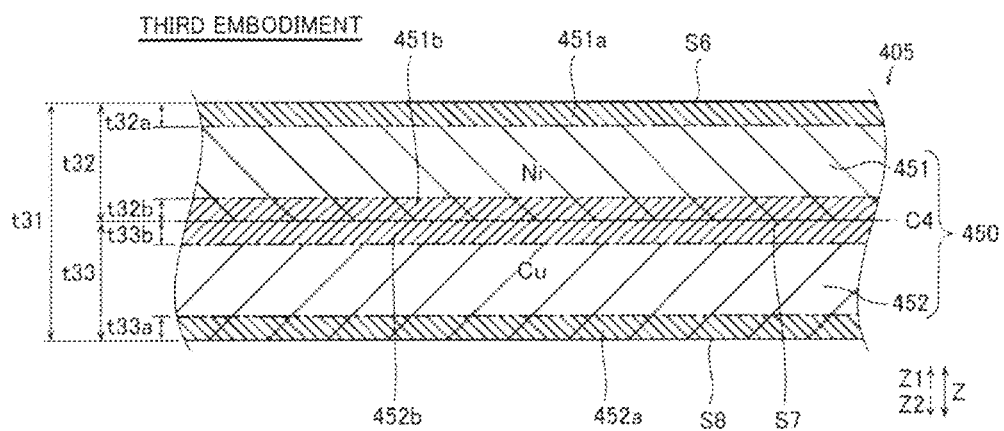
FIG. 14 is a sectional view showing a negative-electrode lead material according to a third embodiment of the present invention.

A third embodiment of the present invention is now described with reference to FIG. 14. In this third embodiment, a negative-electrode lead material 405 includes a two-layered clad material 450, unlike the negative-electrode lead material 205 including the three-layered clad material 250 according to the aforementioned second embodiment. The negative-electrode lead material 405 and the clad material 450 are examples of the "lead material for a battery" and the "composite metal plate" in the claims, respectively.

(Structure of Negative-Electrode Lead Material)

The clad material 450 that the negative-electrode lead material 405 includes according to the third embodiment has a two-layered structure in which a Ni layer 451 and a Cu layer 452 are bonded to each other in a state where the same are stacked in a plate thickness direction (direction Z) in this order from a Z1 side. The Ni layer 451 and the Cu layer 452 are made of pure Ni and pure Cu, respectively. Both the thickness t32 of the Ni layer 451 and the thickness t33 of the Cu layer 452 are about 50% of the thickness t31 of the clad material 450.

According to the third embodiment, the Ni layer 451 is formed with a surface layer portion 451a and a central portion 451b. The surface layer portion 451a includes a surface S6 (a surface further away from a center C4) exposed on a side (a side closer to the Ni layer 451, the Z1 side) of the Ni layer 451 opposite to the Cu layer 452 and a region in the vicinity of the surface S6. The central portion 451b includes the center C4 (an interface S7 between the Ni layer 451 and the Cu layer 452) of the clad material 450 in the plate thickness direction and a region in the vicinity of the center C4 in the Ni layer 451. When the Ni layer 451 is an example of the "metal plate" in the claims, the Cu layer 452 is an example of the "dissimilar metal layer" in the claims.

Specifically, the surface layer portion 451a includes a region corresponding to about 20% of the thickness t32 of the Ni player 451 from the surface S6 along arrow Z2. The central portion 451b includes a region corresponding to about 20% of the thickness t32 of the Ni player 451 from the center C4 along arrow Z1. In other words, the thickness t32a of the surface layer portion 451a and the thickness t32b of the central portion 451b both are (0.2×t32). The central portion 451b is lower in hardness than the surface layer portion 451a.

The Cu layer 452 is formed with a surface layer portion 452a and a central portion 452b, The surface layer portion 452a includes a surface S8 (a surface further away from the center C4) exposed on a side (a side closer to the Cu layer 452, a Z2 side) of the Cu layer 452 opposite to the Ni player 451 and a region in the vicinity of the surface S8. The central portion 452b includes the center C4 (the interface S7) of the clad material 450 in the plate thickness direction and a region in the vicinity of the center C4 in the Cu layer 452. When the Cu layer 452 is an example of the "metal plate" in the claims, the Mi layer 451 is an example of the "dissimilar metal layer" in the claims.

Specifically, the surface layer portion 452a includes a region corresponding to about 20% of the thickness t33 of the Cu layer 452 from the surface S8 along arrow Z1. The central portion 452b includes a region corresponding to about 20% of the thickness t33 of the Cu layer 452 from the center C4 along arrow Z2. In other words, the thickness t33a of the surface layer portion 452a and the thickness t33b of the central portion 452b both are (0.2×t33). The central portion 452b is lower in hardness than the surface layer portion 452a. The remaining structures of the third embodiment are similar to those of the aforementioned second embodiment.

<Method for Manufacturing Negative-Electrode Lead Material>

A method for manufacturing the negative-electrode lead material 405 according to the third embodiment of the present invention is now described with reference to FIGS. 3 to 6, 9, and 14.

First, a Ni plate made of pure Ni and a Cu plate (not shown) made of pure Cu are bonded to each other by rolling at a predetermined rolling reduction similarly to the aforementioned second embodiment in a state where the same are stacked in this order (roll-bonding step). At this time, the thickness of the Ni plate and the thickness of the Cu plate are substantially equal to each other. Thus, a band-like clad material (not shown) having a two-layered structure in which the Ni layer and the Cu layer are bonded to each other in a state where the same are stacked in the plate thickness direction is prepared. Then, similarly to the aforementioned second embodiment, a diffusion annealing step is performed on the bonded clad material, whereby a clad material 450b (see FIG. 3) having improved bonding strength between the metal layers is prepared. The clad material 450b is an example of the "plate material before rolling" in the claims.

Then, similarly to the aforementioned first embodiment, a roiling step is performed on the clad material 450b after diffusion annealing, as shown in FIG. 3, whereby a band-like clad material 450c is prepared. Then, similarly to the aforementioned first embodiment, a slitting step is performed on the band-like clad material 450c, whereby a plurality of band-like clad materials 450d is prepared. At this time, similarly to the aforementioned first embodiment, formation of burrs on side sections E of the clad materials 450d is significantly reduced, and the size of the formed burrs is reduced, as shown in FIG. 4. Then, a plurality of band-like clad materials 450e is prepared by performing an annealing step on the plurality of band-like clad materials 450d, similarly to the aforementioned first embodiment.

Figure 9:
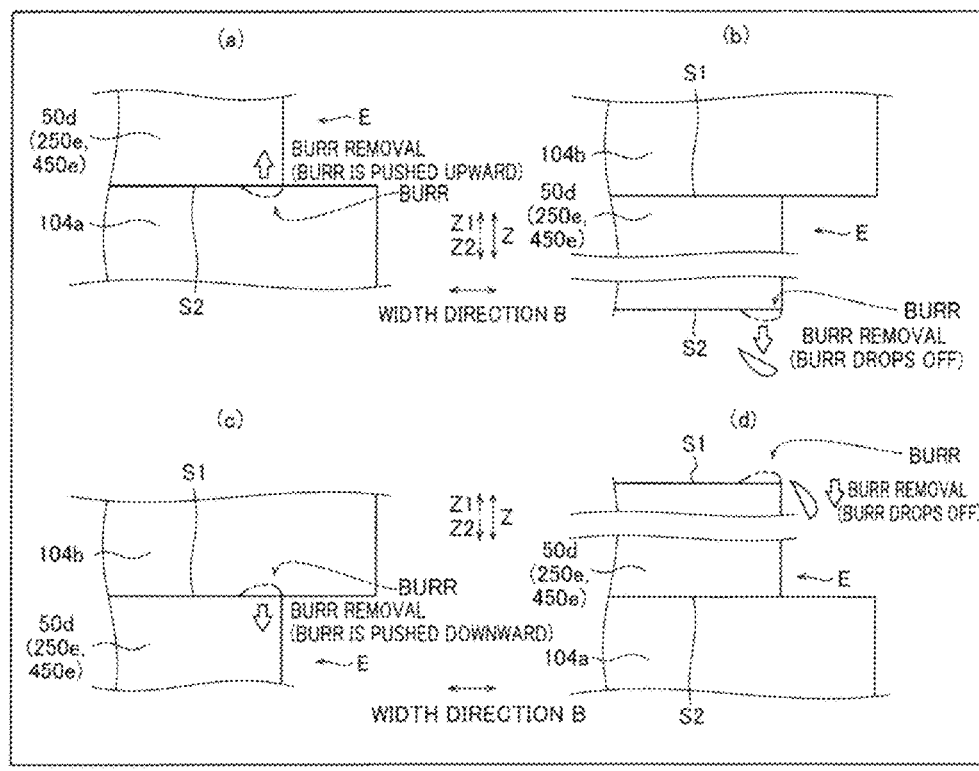
FIG. 9 is a schematic enlarged sectional view for illustrating removal of the burr in the method for manufacturing a negative-electrode lead material according to the first to third embodiments of the present invention.

Then, similarly to the aforementioned first embodiment, bending is repetitively applied through a roller leveler 104 to the plurality of band-like clad materials 450e softened by the annealing step, whereby the hardness of the clad material 450 is adjusted (hardness adjustment step), as shown in FIGS. 5 and 6. Thus, the Ni layer 451 of the clad material 450 is formed with the surface layer portion 451a having a predetermined hardness due to work-hardening in the region in the vicinity of the surface S6 opposite to the Cu layer 452, and is formed with the central portion 451b, which is lower in hardness than the surface layer portion 451a, in the region in the vicinity of the center C4 (interface S7). The Cu layer 452 of the clad material 450 is formed with the surface layer portion 452a having a predetermined hardness due to work-hardening in the region in the vicinity of the surface S8 opposite to the Ni layer 451, and is formed with the central portion 452b, which is lower in hardness than the surface layer portion 452a, in the region in the vicinity of the center C4. In addition, the burrs of the clad materials 450e are removed by the roller leveler 104, as shown in FIG. 9. Thus, the negative-electrode lead material 405 (see FIG. 14) including the clad material 450 is repetitively manufactured.

Effects of Third Embodiments

According to the third embodiment, the following effects can be obtained.

According to the third embodiment, in the Ni layer 451, the hardness of the central portion 451b in the vicinity of the center C4 of the clad material 450 is lower than the hardness of the surface layer portion 451a, and in the Cu layer 452, the hardness of the central portion 452b in the vicinity of the center C4 of the clad material 450 is lower than the hardness of the surface layer portion 452a. Thus, similarly to the second embodiment, both the handleability and the elongation of the negative-electrode lead material 405 can be improved.

In the manufacturing method according to the third embodiment, the thicknesses of the Ni layer and the Cu layer are set to be substantially equal to each other in the roll-bonding step. Thus, in the Ni layer 451 of the negative-electrode lead material 405, the hardness of the central portion 451b in the vicinity of the center C4 of the clad material 450 can be lower than the hardness of the surface layer portion 451a, and in the Cu layer 452, the hardness of the central portion 452b in the vicinity of the center C4 of the clad material 450 can be lower than the hardness of the surface layer portion 452a. The remaining effects of the third embodiment are similar to those of the aforementioned second embodiment.

Modification of Third Embodiment

A modification of the third embodiment of the present invention is now described with reference to FIG. 15. In this modification of the third embodiment, the thickness t42 of a Ni layer 551 is larger than the thickness t43 of a Cu layer 552, unlike the negative-electrode lead material 405 according to the aforementioned third embodiment. The Ni layer 551 and the Cu layer 552 are examples of the "metal plate" and the "dissimilar metal layer" in the claims, respectively.

Figure 15:
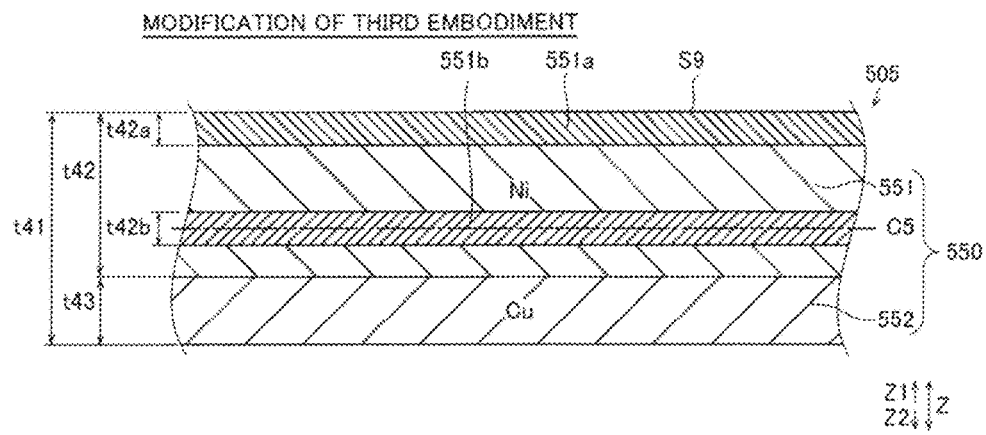
FIG. 15 is a sectional view showing a negative-electrode lead material according to a modification of the third embodiment of the present invention.
Figure 16:
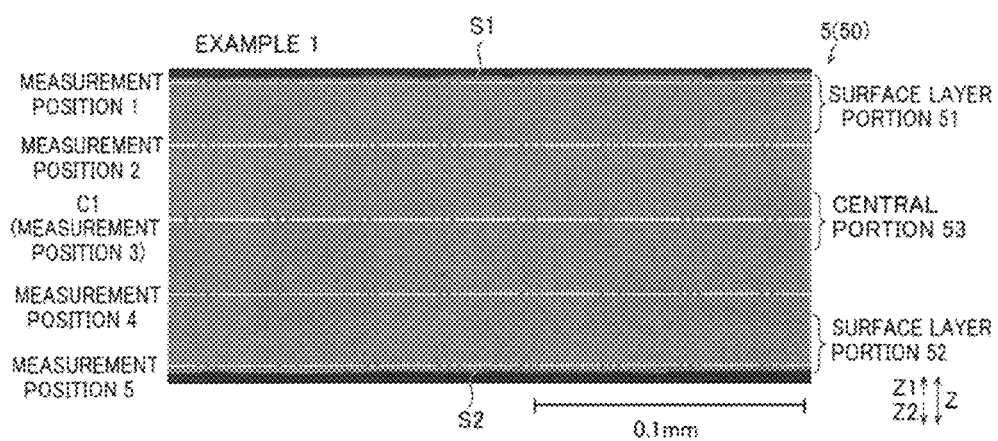
FIG. 16 is a sectional photograph showing a negative-electrode lead material according to Example 1 corresponding to the first embodiment of the present invention.

According to this modification of the third embodiment, in a two-layered clad material 550 that a negative-electrode lead material 505 includes, the thickness t42 of the Ni layer 551 is about 66% of the thickness t41 of the clad material 550, and the thickness t43 of the Cu layer 552 is about 33% of the thickness t41 of the clad material 550, as shown in FIG. 15. In other words, the thickness t43 of the Cu layer 552 is smaller than the thickness t42 of the Ni layer 551. The negative-electrode lead material 505 and the clad material 550 are examples of the "lead material for a battery" and the "composite metal plate" in the claims, respectively.

According to this modification of the third embodiment, the Ni layer 551 is formed with a surface layer portion 551a and a central portion 551b. The surface layer portion 551a includes a first surface S9 (a surface further away from a center C5) exposed on an opposite side (a side closer to the Ni layer 551, a Z1 side) to the Cu layer 552 and a region in the vicinity of the first surface S9, The central portion 551b includes the center C5 of the clad material 550 in a plate thickness direction and a region in the vicinity of the center C5.

Specifically, the surface layer portion 551a includes a region corresponding to about 20% of the thickness t42 of the Ni layer 551 from the first surface S9 along arrow Z2, The central portion 551b includes a region corresponding to about 10% of the thickness t42 of the Ni layer 551 from the center C5 along arrow Z1 and a region corresponding to about 10% of the thickness t42 of the Ni layer 551 from the center C5 along arrow Z2. In other words, the thickness t42a of the surface layer portion 551a and the thickness t42b of the central portion 551b both are (0.2×t42). The central portion 551b is lower in hardness than the surface layer portion 551a. The remaining structures of the modification of the third embodiment are similar to those of the aforementioned third embodiment. A manufacturing method of the modification of the third embodiment is similar to that of the aforementioned third embodiment except that the thickness of the Cu plate is set to be smaller than the thickness of the Ni plate in a roll-bonding step.

Effects of Modification of Third Embodiment

According to the modification of the third embodiment, the following effects can be obtained.

According to the modification of the third embodiment, the thickness of the Cu plate is set to be smaller than the thickness of the Ni plate in the roll-bonding step. Thus, in the Ni layer 551 of the negative-electrode lead material 505, the hardness of the central portion 551b in the vicinity of the center C5 of the clad material 550 can be lower than the hardness of the surface layer portion 551a. The remaining effects of the modification of the third embodiment are similar to those of the aforementioned third embodiment.

EXAMPLES

Experiments conducted in order to confirm the effects of the aforementioned embodiments are now described with reference to FIGS. 2, 3, 5, 11, and 16 to 19.
(Negative-Electrode Lead Materials According to Examples 1 and 2, Test Materials According to Comparative Examples 1 and 2)

First, a negative-electrode lead material 5 according to Example 1 was prepared by the manufacturing method according to the aforementioned first embodiment. Specifically, an ingot of electrolytic Ni (pure Ni) was shaped to a Ni plate material having a thickness of 50 mm by hot rolling, and thereafter cold rolling and annealing were repetitively performed on the Ni plate material, as shown in FIG. 3. Then, the final cold rolling is performed by a pair of rollers 101a on a band-like Ni plate material 50a, whereby a band-like Ni plate material 50b having a thickness of 0.1 mm was prepared (rolling step). Then, the band-like Ni plate material 50b hardened by the rolling step was continuously cut by a slitting portion 102 (slitting step) to have a width (a length in a width direction B) of 3 mm. Then, metal plates 50c were annealed for three minutes in a temperature condition of 800° C. under a non-oxidizing atmosphere (annealing step).

Then, hardness adjustment was performed by a roller leveler 104 (hardness adjustment step) on a plurality of metal plates 50d softened by the annealing step, as shown in FIGS. 5 and 6. At this time, the roller leveler 104 including thirty rollers (fifteen lower rollers 104a and fifteen upper rollers 104b) each having a diameter of 10 mm (a radius R of 5 mm) was used. Distances L between the axes of the lower rollers 104a and the upper rollers 104b in a conveying direction A were set to 30 mm while an angle θ defined by a perpendicular 11 passing through the axis of a lower roller 104c closer to an inlet and a line 12 connecting the axis of the lower roller 104c and the axis of an upper roller 104d to each other was set to 107 degrees, and a distance H between the axes was set to 31.3 mm, as shown in FIG. 7. Thus, the negative-electrode lead material 5 (see FIG. 2) according to Example 1, including a metal plate 50 made of pure Ni, was prepared.

Next, a negative-electrode lead material 205 according to Example 2 was prepared by the manufacturing method according to the aforementioned second embodiment, Specifically, a three-layered clad material 250a, in which a Ni layer, a Cu layer, and a Ni layer were bonded to each other in a state where the same were stacked in a plate thickness direction (direction Z) in this order from a Z1 side by rolling a Ni plate 251a made of pure Ni, a Cu plate 252d made of pure Cu, and a Ni plate 253a made of pure Ni at a rolling reduction of 60% in a state where the same were stacked in this order to have a thickness of 1 mm, was prepared, as shown in FIG. 11. At this time, the Ni layer, the Cu layer, and the Ni layer were formed such that the thickness of the Ni layer, the thickness of the Cu layer, and the thickness of the Ni layer had a relationship of 1:2:1. Then, the band-like clad material 250a was held for three minutes at 800° C. to be diffusion-annealed, whereby a clad material 250b having improved bonding strength between the metal layers was prepared. Then, as shown in FIG. 3, cold rolling and annealing were repetitively performed (rolling step) on the clad material 250b, whereby a band-like clad material 250c having a thickness of 0.1 mm was prepared. Then, by a manufacturing method (a slitting step, an annealing step, and a hardness adjustment step) similar to Example 1 described above, the negative-electrode lead material 205 (see FIG. 10) according to Example 2, including the clad material 250 having a three-layered structure in which a Ni layer 251, a Cu layer 252, and a Ni layer 253 were bonded to each other in a state where the same were stacked, was prepared.

A test material according to Comparative Example 1 corresponding to the negative-electrode lead material 5 according to Example 1 was prepared. Specifically, similarly to Example 1 described above, an ingot of electrolytic Ni (pure Ni) was shaped to a Ni plate material having a predetermined thickness by hot rolling, and thereafter cold rolling and annealing were repetitively performed (roiling step) on the Ni plate material. Then, a band-like Ni plate material having a thickness of 0.105 mm was prepared by the final cold rolling, and was annealed for three minutes in a temperature condition of 800° C. under a non-oxidizing atmosphere (annealing step). Then, in order to adjust the hardness of the Ni plate material to be higher, the final cold rolling (a skin pass step, a light reduction roiling step) was performed on the Ni plate material in a state where a low pressure was applied to the Ni plate material. Thus, the test material according to Comparative Example 1, having a thickness of 0.1 mm and including a metal plate made of pure Ni, was prepared.

A test material according to Comparative Example 2 corresponding to the negative-electrode lead material 205 according to Example 2 was prepared. Specifically, similarly to Example 2 described above, a three-layered clad material on which diffusion annealing had been performed, in which a Ni layer, a Cu layer, and a Ni layer were bonded to each other in a state where the same were stacked in a plate thickness direction (direction Z) in this order from a Z1 side, was prepared. Then, the test material according to Comparative Example 2, including a clad material having a thickness of 0.1 mm, was prepared by a manufacturing method (a rolling step, an annealing step, and a light reduction roiling step) similar to Comparative Example 1.

(Hardness Measurement for Sections)

The negative-electrode lead materials 5 and 205 according to Examples 1 and 2 and the test materials according to Comparative Examples 1 and 2 each were cut in a width direction B and were embedded in resins. After the cut sections were roughly polished by SiC polishing paper having a grain size of P1200 defined in JIS R 6011, the sections were polished by alumina grains of 5 μm, and were finally polished by silica grains of 0.04 μm. Then, a load of 0.09807N is applied to the polished sections by a Vickers hardness measuring instrument that complies with JIS Z 2244, whereby the hardness of each of the sections was measured. In Example 1, the Vickers hardness was measured at five measurement positions in a plate thickness direction, as shown in a photograph of FIG. 16. Specifically, the Vickers hardness was measured at a measurement position 1 in the vicinity of a first surface S1 corresponding to a surface layer portion 51, at a measurement position 2 in the vicinity of a position of 25% of the thickness of the metal plate 50 from the first surface S1 along arrow Z2, at a measurement position 3 in the vicinity of a center C1 corresponding to a central portion 53, at a measurement position 4 in the vicinity of a position of 75% of the thickness of the metal plate 50 from the first surface S1 along arrow Z2, and at a measurement position 5 in the vicinity of a second surface S2 corresponding to a surface layer portion 52. The measurement positions 2 and 4 are located between the surface layer portion 51 and the central portion 53.

In Comparative Example 1 corresponding to Example 1, the Vickers hardness was measured at positions corresponding to the measurement positions 1, 2, and 3 of Example 1.

Figure 17:
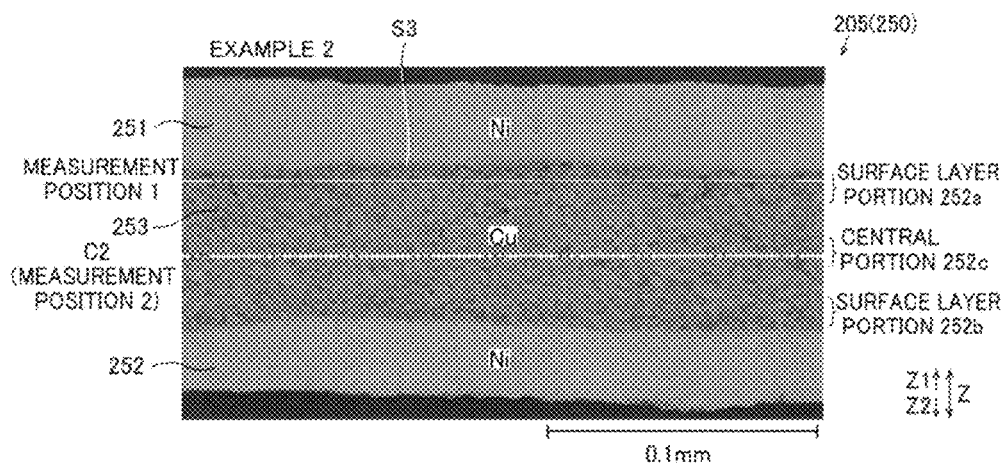
FIG. 17 is a sectional photograph showing a negative-electrode lead material according to Example 2 corresponding to the second embodiment of the present invention.

In Example 2, the Vickers hardness was measured at two measurement positions in the plate thickness direction, as shown in a photograph of FIG. 17, Specifically, the Vickers hardness was measured at a measurement position 1 of a section in the vicinity of a first surface S3 corresponding to a surface layer portion 252a and at a measurement position 2 of the section in the vicinity of a center C2 corresponding to a central portion 252c, In Comparative Example 2 corresponding to Example 2, the Vickers hardness was measured at positions corresponding to the measurement positions 1 and 2 of Example 2.

In each of the measurement positions in the plate thickness direction, the Vickers hardness was measured at multiple spots. The average of the measured values was set to an average hardness in each of the measurement-positions. Then, assuming that the Vickers hardness in the measurement position 1 was 100%, the ratio of the hardness in each of the remaining measurement positions to the Vickers hardness in the measurement position 1 was obtained. Measurement results for Example 1 and Comparative Example 1 are shown in Table 1, and measurement results for Example 2 and Comparative Example 2 are shown in Table 2.

TABLE 1

|  | EXAMPLE 1 | | COMPARATIVE EXAMPLE 1 | |
| --- | --- | --- | --- | --- |
|  | AVERAGE HARDNESS (HV) | HARDNESS RATIO (%) | AVERAGE HARDNESS (HV) | HARDNESS RATIO (%) |
| MEASUREMENT POSITION 1 (SURFACE LAYER PORTION) | 111.7 | 100 | 118.1 | 100 |
| MEASUREMENT POSITION 2 | 109.2 | 98 | 122.6 | 110 |
| MEASUREMENT POSITION 3 (CENTRAL PORTION) | 99.3 | 89 | 123.2 | 110 |
| MEASUREMENT POSITION 4 | 105.1 | 94 |  |  |
| MEASUREMENT POSITION 5 (SURFACE LAYER PORTION) | 116.2 | 104 |  |  |

TABLE 2

|  | EXAMPLE 2 | | COMPARATIVE EXAMPLE 2 | |
| --- | --- | --- | --- | --- |
|  | AVERAGE HARDNESS (HV) | HARDNESS RATIO (%) | AVERAGE HARDNESS (HV) | HARDNESS RATIO (%) |
| MEASUREMENT POSITION 1 (SURFACE LAYER PORTION) | 75.6 | 100 | 75.3 | 100 |
| MEASUREMENT POSITION 2 (CENTRAL PORTION) | 69.9 | 93 | 75.5 | 100 |

It has been confirmable from the measurement results shown in Table 1 that in Example the hardness ratio of the measurement position 3 (central portion) to the measurement position 1 (surface layer portion) is not more than 90% (89%) whereas in Comparative Example 1, the hardness ratio of the measurement position 3 to the measurement position 1 is 110%. It has been confirmable from the measurement results shown in Table 2 that in Example 2, the hardness ratio of the measurement position 2 (central portion) to the measurement position 1 (surface layer portion) is not more than 93% (93%) whereas in Comparative Example 2, the hardness ratio of the measurement position 2 to the measurement position 1 is 100%. Thus, it has been confirmable that the hardness of the central portion can be set to be lower than the hardness of the surface layer portion by performing hardness adjustment by the roller leveler unlike the case where hardness adjustment is performed by skin pass.

(Measurement of Mechanical Characteristics)

As the mechanical characteristics of the negative-electrode lead materials 5 and 205 according to Examples 1 and 2 and the mechanical characteristics of the test materials of Comparative Examples 1 and 2, the surface hardness, the tensile strength, and the elongation were measured. Specifically, as the surface hardness, the Vickers hardness of a surface of the metal material (Ni layer) exposed on the first surface of the negative-electrode lead material (test material) was measured by a method similar to the aforementioned method for measuring the hardness of the sections. Furthermore, a stress at the time of fracture of the negative-electrode lead material (test material) was obtained as the tensile strength by a tensile measuring instrument that complies with JIS Z 2241, and a ratio of an elongation amount at the time of fracture (=(the length of the negative-electrode lead material (test material) immediately before fracture– the length of the negative-electrode lead material (test material) before a tensile test)/the length of the negative-electrode lead material (test material) before a tensile test) was measured as the elongation (%). The measurement results for the mechanical characteristics are shown in Table 3.

TABLE 3

|  | SURFACE HARDNESS (HV) | TENSILE STRENGTH (N/mm$^2$) | ELONGATION (%) |
| --- | --- | --- | --- |
| EXAMPLE 1 | 130 | 363 | 34 |
| COMPARATIVE EXAMPLE 1 | 119 | 412 | 28 |
| EXAMPLE 2 | 114 | 284 | 30 |
| COMPARATIVE EXAMPLE 2 | 122 | 324 | 18 |

It has been proved from the measurement results shown in Table 3 that although the surface hardness in Example 1 is higher than the surface hardness in Comparative Example 1, and the surface hardness in Example 2 is lower than the surface hardness in Comparative Example 2, the surface hardness (HV) in each of Examples 1 and 2 is higher than 110. In addition, it has been proved that the tensile strengths in Examples 1 and 2 are lower than the tensile strengths of corresponding Comparative Examples 1 and 2, respectively, and the elongation in Example 1 and the elongation in Example 2 are larger than the elongation in corresponding Comparative Example 1 and the elongation in corresponding Comparative Example 2, respectively. Thus, it has been confirmable that the negative-electrode lead materials 5 and 205 according to Examples 1 and 2 each retain a sufficient surface hardness and have an elongation. Consequently, it has been confirmable that both the handleability and the elongation of each of the negative-electrode lead materials 5 and 205 according to Examples 1 and 2 are improved.

(Observation of Burrs)

The states of burrs formed on side sections exposed by the slitting step in the negative-electrode lead material 205 according to Example 2 and the test material according to Comparative Example 2 were observed. On the test material according to Comparative Example 2, a light reduction rolling step was performed after an annealing step, and a slitting step similar to that in Example 2 was performed.

Figure 18:
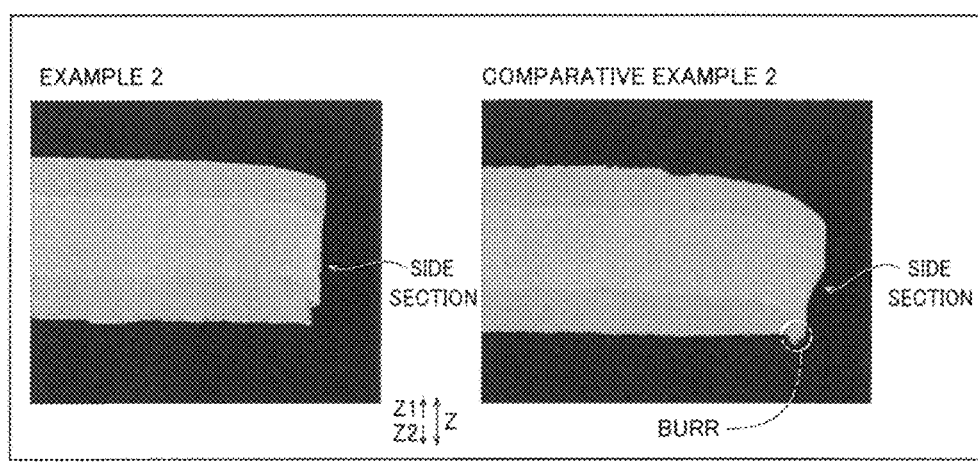
FIG. 18 is a sectional photograph showing the vicinity of a side section in each of Example 2 and Comparative Example 2.

From a sectional photograph shown in FIG. 18, it has been proved that almost no burr is observed on the side section in Example 2. This is conceivably due to the fact that in Example 2, the clad material was hardened by the rolling step immediately before the slitting step so that the clad material was hardly elongated downward at the time of cutting in the slitting step (see FIG. 4) and the fact that the roller leveler removed the burrs in the hardness adjustment step (see FIG. 9). On the other hand, it has been proved that in Comparative Example 2, burrs extending downward (along arrow Z2) are observed. This is conceivably due to the fact that the clad material was softened by the annealing step immediately before the slitting step so that the clad material was elongated downward at the time of cutting in the slitting step and the fact that the burrs were not removed in the subsequent light reduction rolling step.

(Setting of Roller Leveler)

Finally, in Example 1, the surface hardness of the negative-electrode lead material 5 changed when the number of rollers (the lower rollers 104a and the upper rollers 104b) of the roller leveler 104 and the angle θ were changed was confirmed. Specifically, in the hardness adjustment step for preparing the negative-electrode lead material 5 according to Example 1 shown in FIGS. 5 and 6, the hardness of the metal plate 50d was adjusted in a state where the angle θ of the roller leveler 104 was set to any one of 107 degrees (H=31.3 mm), 103 degrees (H=30.8 mm), 99 degrees (H=30.4 mm), and 98 degrees (H=30.3 mm), and the number of rollers was properly changed. When the number of rollers is increased, the number of times of bending is increased. As the surface hardness, the Vickers hardness of an exposed surface of each metal plate 50 was measured. The measurement results are shown in FIG. 19.

It has been proved from a graph shown in FIG. 19 that the surface hardness of the negative-electrode lead material 5 is increased by increasing the number of rollers. Thus, it has been confirmable that the surface hardness can be adjusted by adjusting the number of rollers to adjust the number of times of bending to be repetitively applied. When the number of rollers was constant, it was observed that the surface hardness of the negative-electrode lead material 5 tended to be increased by reducing the angle θ (the distance H between the axes). This is conceivably due to the fact that the curvature of bending to be applied to the metal plates 50*d* was increased by reducing the angle θ so that a force to be applied to the surface layer portions 51 and 52 (see FIG. 2) at the time of bending was increased, and hence the surface layer portions 51 and 52 were further work-hardened.

[Modification]

The embodiments and Examples disclosed this time must be considered as illustrative in all points and not restrictive. The range of the present invention is shown not by the above description of the embodiments and Examples but by the scope of claims for patent, and all modifications within the meaning and range equivalent to the scope of claims for patent are further included.

For example, while the negative-electrode lead material 5 is used in the cylindrical lithium-ion battery (battery 100) in the aforementioned first embodiment, the present invention is not restricted to this. According to the present invention, the negative-electrode lead material may alternatively be used in a battery other than the lithium-ion battery. For example, the negative-electrode lead material may be used in a laminated battery not the cylindrical battery. When the negative-electrode lead material is used in the laminated battery, the negative-electrode lead material is exposed externally of the battery, and hence the negative-electrode lead material is preferably configured such that a Ni-based alloy having high corrosion resistance is exposed on the surface. In other words, in the laminated battery, the negative-electrode lead material 5 of the metal plate 50 made of pure Ni according to the first embodiment, the negative-electrode lead material 205 of the clad material 250 in which the Ni layers 251 and 253 made of pure Mi are exposed on the surface according to the second embodiment, etc. are preferably used.

While the negative-electrode lead material 5 (205, 305, 405, 505) is shown as the lead material for a battery in each of the aforementioned first to third embodiments, the present invention is not restricted to this. The lead material for a battery according to the present invention may alternatively be used as the positive-electrode lead material.

While the metal plate 50 is made of pure Ni in the aforementioned first embodiment, the present invention is not restricted to this. According to the present invention, the metal plate may alternatively be made of single metal (pure Cu, for example) other than pure Ni. The metal plate is preferably made of any one of pure Ni and a Ni-based alloy. The Ni-based alloy preferably contains at least about 90 mass % of Ni. As the Mi-based alloy, there is a Ni—Cu based alloy in No. NW4400s of JIS, for example.

While the clad material includes the Ni layer (dissimilar metal layer) made of pure Mi and the Cu layer (metal plate) made of pure Cu in the aforementioned second embodiment, the present invention is not restricted to this. According to the present invention, the dissimilar metal layer of the clad material may alternatively be made of metal other than pure Ni, or the metal plate of the clad material may alternatively be made of metal other than pure Cu. The metal plate is preferably made of any one of pure Cu and a Cu-based alloy. The Cu-based alloy preferably contains at least about 90 mass % of Cu. As the Cu-based alloy, there is a Cu—Fe based alloy, which is C194, for example.

While the rolling step, the slitting step, the annealing step, and the hardness adjustment step are continuously performed in the aforementioned first embodiment, and the roll-bonding step, the diffusion annealing step, the rolling step, the slitting step, the annealing step, and the hardness adjustment step are continuously performed in each of the aforementioned second and third embodiments, the present invention is not restricted to this. According to the present invention, the rolling step, the slitting step, the annealing step, and the hardness adjustment step, or the roll-bonding step, the diffusion annealing step, the roiling step, the slitting step, the annealing step, and the hardness adjustment step may not be continuously performed but may alternatively be performed separately, or only a part of the steps may alternatively be continuously performed.

While as the step of cutting the plate material (metal plate) hardened by rolling, the slitting step of cutting the Mi plate material 50*b* (clad materials 250*c*, 450*c*) into a band shape is performed in each of the aforementioned first to third embodiments, the present invention is not restricted to this. According to the present invention, the step of cutting the metal plate hardened by rolling is only required, and the slitting step of cutting the metal plate into a band shape may not be used. The step of cutting the metal plate hardened by roiling may be a step of cutting the hardened metal plate in the width direction or a step of cutting the hardened metal plate in both the conveying direction and the width direction, for example. Even by these steps, formation of burrs can be significantly reduced. Furthermore, in the setting of the roller leveler, the respective radii R1 and R2 of a pair of rollers may not be the same as each other but may be different from each other, or the angle θ, the distance H between the axes, and the distances L between the axes may be gradually varied from the inlet of the roller leveler toward the outlet thereof.

While the three-layered clad material 250 is shown as the negative-electrode lead material 205 including the composite metal plate in the aforementioned second embodiment, and the two-layered clad material 450 is shown as the negative-electrode lead material 405 including the composite metal plate in the aforementioned third embodiment, the present invention is not restricted to this. According to the present invention, the lead material for a battery including the composite metal plate may alternatively be a clad material having a four or more layered structure. The lead material for a battery including the composite metal plate is only required to include a composite metal plate in which a metal plate made of single metal and a dissimilar metal layer made of metal different in component from the metal plate are stacked. The lead material for a battery may include a composite metal plate in which a dissimilar metal layer is plated on a surface of a metal plate or a composite metal plate in which a metal plate and a dissimilar metal layer are bonded to each other by an adhesive, for example.

What is claimed is:

1. A lead material for a battery, comprising a metal plate made of single metal, in which a hardness of a central portion is lower than a hardness of a surface layer portion.

2. The lead material for a battery according to claim 1, wherein
the hardness of the central portion of the metal plate is not more than 95% of the hardness of the surface layer portion of the metal plate.

3. The lead material for a battery according to claim 2, wherein the hardness of the central portion of the metal plate is not more than 90% of the hardness of the surface layer portion of the metal plate.

4. The lead material for a battery according to claim 1, wherein the metal plate is made of pure Ni or a Ni-based alloy.

5. The lead material for a battery according to claim 1, further comprising a dissimilar metal layer stacked on the metal plate and made of metal that is different in component from the metal plate.

6. The lead material for a battery according to claim 5, wherein
the metal plate is held between dissimilar metal layers.

7. A lead material for a battery, including a composite metal plate comprising:
a metal plate made of single metal; and
a dissimilar metal layer made of metal that is different in component from the metal plate,
wherein a hardness of a central portion of the composite metal plate is lower than a hardness of a surface layer portion of the composite metal plate.

8. The lead material for a battery according to claim 7, wherein
a thickness of the dissimilar metal layer is not more than a thickness of the metal plate, and
the hardness of the central portion of the composite metal plate is lower than the hardness of the surface layer portion, closer to the metal plate, of the composite metal plate.

* * * * *